United States Patent
Wang et al.

(10) Patent No.: US 11,579,248 B2
(45) Date of Patent: Feb. 14, 2023

(54) METHOD, APPARATUS AND ELECTRONIC EQUIPMENT FOR RECOGNIZING POSTURE OF TARGET

(71) Applicant: BEIHANG UNIVERSITY, Beijing (CN)

(72) Inventors: Xiangrong Wang, Beijing (CN); Huaiyuan Liang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 238 days.

(21) Appl. No.: 17/092,094

(22) Filed: Nov. 6, 2020

(65) Prior Publication Data
US 2021/0325512 A1 Oct. 21, 2021

(30) Foreign Application Priority Data
Apr. 21, 2020 (CN) .......................... 202010315851.0

(51) Int. Cl.
*G01S 7/41* (2006.01)
*G01S 13/02* (2006.01)
*G01S 13/44* (2006.01)

(52) U.S. Cl.
CPC .......... *G01S 7/415* (2013.01); *G01S 13/0209* (2013.01); *G01S 13/4454* (2013.01)

(58) Field of Classification Search
CPC ................ G01S 7/415; G01S 13/0209; G01S 13/4454; G01S 13/589; G01S 13/88; G01S 7/417; G01S 7/411
See application file for complete search history.

(56) References Cited

U.S. PATENT DOCUMENTS

| 11,333,749 B2 * | 5/2022 | Wang | G01S 7/354 |
| 2015/0186726 A1 * | 7/2015 | Jiang | G06V 10/806 |
| | | | 382/195 |
| 2018/0157330 A1 * | 6/2018 | Gu | G01S 7/415 |

FOREIGN PATENT DOCUMENTS

| CN | 102841348 A | 12/2012 |
| CN | 103901425 A | 7/2014 |

(Continued)

OTHER PUBLICATIONS

Nanzer, J.A. & Zilevu, K.S., 2014. Dual interferometric-doppler measurements of the radial and angular velocity of humans. IEEE Transactions on Antennas and Propagation, 62(3), pp. 1513-1517 (Year: 2014).*

(Continued)

*Primary Examiner* — Vladimir Magloire
*Assistant Examiner* — Oladimeji Oyegunle
(74) *Attorney, Agent, or Firm* — J.C. Patents

(57) ABSTRACT

The present application provides a method, apparatus and electronic equipment for recognizing a posture of a target, a first receiving signal and a second receiving signal upon scattering of a transmitting signal from a target to be recognized are acquired, a first baseband signal is determined according to the first receiving signal and the transmitting signal, and a second baseband signal is determined according to the second receiving signal and the transmitting signal; and a category of the posture of the target to be recognized is finally determined according to the first baseband signal and the second baseband signal. The first baseband signal and the second baseband signal carry various feature values related to the posture of the target, including but not limited to transversal velocity information and radial velocity information, etc.

6 Claims, 22 Drawing Sheets

(56) References Cited

FOREIGN PATENT DOCUMENTS

| CN | 104076352 A | | 10/2014 | | |
|---|---|---|---|---|---|
| CN | 105786185 A | | 7/2016 | | |
| CN | 106250854 A | | 12/2016 | | |
| CN | 106324589 A | | 1/2017 | | |
| CN | 106872974 A | | 6/2017 | | |
| CN | 107358250 A | | 11/2017 | | |
| CN | 107430444 A | | 12/2017 | | |
| CN | 107886121 A | | 4/2018 | | |
| CN | 108594198 A | | 9/2018 | | |
| CN | 108614267 A | | 10/2018 | | |
| CN | 108680917 A | | 10/2018 | | |
| CN | 108957443 A | | 12/2018 | | |
| CN | 109298412 A | | 2/2019 | | |
| CN | 109298412 A | * | 2/2019 | ........... | G01S 13/583 |
| CN | 109313259 A | | 2/2019 | | |
| CN | 109633620 A | | 4/2019 | | |
| CN | 109859526 A | | 6/2019 | | |
| CN | 110109102 A | | 8/2019 | | |
| CN | 110361725 A | | 10/2019 | | |
| CN | 110389338 A | | 10/2019 | | |
| CN | 110431436 A | | 11/2019 | | |
| CN | 110431437 A | | 11/2019 | | |
| CN | 110873877 A | | 3/2020 | | |
| DE | 102012024998 A1 | | 6/2014 | | |
| JP | 2019066287 A | | 4/2019 | | |
| KR | 20190090626 A | | 8/2019 | | |

OTHER PUBLICATIONS

First Office Action of the priority application CN202010315851.0.

* cited by examiner

METHOD, APPARATUS AND ELECTRONIC EQUIPMENT FOR RECOGNIZING POSTURE OF TARGET

CROSS-REFERENCE TO RELATED APPLICATION

This application claims priority to Chinese Patent Application No. 202010315851.0, filed on Apr. 21, 2020, which is hereby incorporated by reference in its entirety.

TECHNICAL FIELD

The present application relates to the field of computer signal processing, and in particular, to a method, apparatus and electronic equipment for recognizing a posture of a target.

BACKGROUND

Recently, with the vigorous development of computer technologies, the application of posture recognition of a moving target by virtue of computer technologies has become more and more widespread, such as gesture recognition, head posture recognition, drop recognition, body motion recognition and so on.

However, a traditional recognition method uses a radar to transmit a microwave and receive an echo. Performing time-frequency analysis on the radar echo to obtain a Micro-Doppler feature of the echo, then recognizing and classifying the moving target. However, the method in which analysis is purely performed on the radar echo can only reflect a radical velocity feature of the target, rather than a transversal motion feature of the target, thereby making the accuracy of posture recognition of a target highly sensitive to an azimuth angle. When the azimuth angle of the moving target deviating from a positive direction of the radar exceeds a certain range, the accuracy of the recognition will be greatly influenced. Moreover, the radar can only obtain projection of the target's velocity along the radial direction, since the radial projection cannot reflect the transversal motion feature, thus leading to low accuracy of recognizing horizontally symmetrical gestures (such as swiping from left to right and swiping from right to left) by the radar.

On the other hand, another solution to the above problem in prior art is to use a Multiple-Input Multiple-Output (MIMO) radar to obtain angle information of the target by applying an array antenna. However, accurate angle information requires multi-antenna arrays, which is in a tradeoff relationship with hardware cost. Also, the time complexity of array signal processing is relatively high, thereby making the real-time interaction based on postures of the moving target difficult.

SUMMARY

The present application provides a method and apparatus for recognizing a posture of a target, electronic equipment, and a storage medium to solve the problem that a position of the target and horizontally symmetrical motion of the target affect the recognition accuracy and stability due to the fact that the traditional radar in the prior art cannot reflect the transversal moving feature of the target's posture, and the problem of high hardware cost due to the introduction of the MIMO radar, high complexity of array signal processing and poor real-time interactivity.

In a first aspect, the present application provides a method for recognizing a posture of a target, including:

acquiring a first receiving signal and a second receiving signal upon scattering of a transmitting signal from a target to be recognized, where the transmitting signal is transmitted by a transmitting antenna of a radar, the first receiving signal is received by a first receiving antenna of the radar, the second receiving signal is received by a second receiving antenna of the radar, and the radar includes at least two receiving antennas;

determining a first baseband signal according to the first receiving signal and the transmitting signal, and determining a second baseband signal according to the second receiving signal and the transmitting signal; and determining a category of the posture of the target to be recognized according to the first baseband signal and the second baseband signal.

Optionally, where the determining a category of the posture of the target to be recognized according to the first baseband signal and the second baseband signal includes: determining, according to the first baseband signal and the second baseband signal, radial velocity information of the target to be recognized by using a preset time-frequency analysis algorithm; performing interferometric processing on the first baseband signal and the second baseband signal to obtain transversal velocity information of the target to be recognized; and determining the category of the posture of the target to be recognized according to the transversal velocity information and the radial velocity information.

Optionally, where the performing interferometric processing on the first baseband signal and the second baseband signal to obtain transversal velocity information of the target to be recognized includes: performing interferometric processing on the first baseband signal and the second baseband signal to obtain an interferometric signal; determining, according to the interferometric signal, an interferometric time-frequency spectrum of the target to be recognized by using the preset time-frequency analysis algorithm; and determining an interferometric empirical feature according to the interferometric time-frequency spectrum and a preset feature extraction algorithm, where the transversal velocity information includes the interferometric empirical feature.

Optionally, where the determining, according to the first baseband signal and the second baseband signal, radial velocity information of the target to be recognized by using a preset time-frequency analysis algorithm includes: using the preset time-frequency analysis algorithm to determine a first time-frequency spectrum corresponding to the first baseband signal and a second time-frequency spectrum corresponding to the second baseband signal; and determining a first empirical feature according to the first time-frequency spectrum and the preset feature extraction algorithm, and determining a second empirical feature according to the second time-frequency spectrum and the preset feature extraction algorithm, where the radial velocity information includes the first empirical feature and the second empirical feature.

Optionally, where the determining the category of the posture of the target to be recognized according to the transversal velocity information and the radial velocity information includes: determining, according to the transversal velocity information and the radial velocity information, the category of the posture of the target to be recognized by using a support vector machine with a linear kernel.

Optionally, where the preset feature extraction algorithm includes: extraction of information on a centroid for positive frequencies and information on a centroid for negative frequencies in a time-frequency spectrum, where the information on the centroid includes a frequency of the centroid and a time of the centroid, the time-frequency spectrum includes the interferometric time-frequency spectrum, the first time-frequency spectrum and the second time-frequency spectrum, the positive frequency is a frequency when the target to be recognized moves toward the radar, and the negative frequency is a frequency when the target to be recognized moves away from the radar; and generation of empirical features according to the information on the centroid for the positive frequencies and the information on the centroid for the negative frequencies, where the empirical features include the interferometric empirical feature, the first empirical feature and the second empirical feature.

Optionally, where the empirical features include a first feature value, a second feature value and a third feature value; the first feature value is an average frequency of a time-frequency spectrum; the second feature value is a difference between the frequency of the centroid for the positive frequencies and the frequency of the centroid for the negative frequencies in a time-frequency spectrum; and the third feature value is a difference between the time of the centroid for the positive frequencies and the time of the centroid for the negative frequencies in a time-frequency spectrum.

Optionally, where the preset time-frequency analysis algorithm is to perform a short-time Fourier transform on a signal to obtain a Micro-Doppler time-frequency spectrum.

In a second aspect, the present application provides apparatus for recognizing a posture of a target, including: a signal acquiring module, configured to acquire a first receiving signal and a second receiving signal upon scattering of a transmitting signal from a target to be recognized; a signal processing module, configured to determine a first baseband signal according to the first receiving signal and the transmitting signal, and determine a second baseband signal according to the second receiving signal and the transmitting signal; a target posture recognizing module, configured to determine a category of the posture of the target to be recognized according to the first baseband signal and the second baseband signal.

Optionally, the signal processing module is further configured to determine, according to the first baseband signal and the second baseband signal, radial velocity information of the target to be recognized by using a preset time-frequency analysis algorithm; the signal processing module is further configured to perform interferometric processing to the first baseband signal and the second baseband signal to obtain transversal velocity information of the target to be recognized; and the target posture recognizing module is configured to determine the category of the posture of the target to be recognized according to the transversal velocity information and the radial velocity information.

Optionally, the signal processing module is further configured to perform interferometric processing to the first baseband signal and the second baseband signal to obtain an interferometric signal; the signal processing module is further configured to determine, according to the interferometric signal, an interferometric time-frequency spectrum of the target to be recognized by using the preset time-frequency analysis algorithm; and the signal processing module is further configured to determine an interferometric empirical feature according to the interferometric time-frequency spectrum and a preset feature extraction algorithm, where the transversal velocity information includes the interferometric empirical feature.

Optionally, the signal processing module is further configured to use the preset time-frequency analysis algorithm to determine a first time-frequency spectrum corresponding to the first baseband signal and a second time-frequency spectrum corresponding to the second baseband signal; and the signal processing module is further configured to determine a first empirical feature according to the first time-frequency spectrum and the preset feature extraction algorithm, and determine a second empirical feature according to the second time-frequency spectrum and the preset feature extraction algorithm, where the radial velocity information includes the first empirical feature and the second empirical feature.

Optionally, the target posture recognizing module is configured to determine, according to the transversal velocity information and the radial velocity information, the category of the posture of the target to be recognized by using a support vector machine with a linear kernel.

Optionally, the signal processing module is further configured to extract information on a centroid for positive frequencies and information on a centroid for negative frequencies in a time-frequency spectrum, where the information on the centroid includes a frequency of the centroid and a time of the centroid, the time-frequency spectrum includes the interferometric time-frequency spectrum, the first time-frequency spectrum and the second time-frequency spectrum, the positive frequency is a frequency when the target to be recognized moves toward the radar, and the negative frequency is a frequency when the target to be recognized moves away from the radar; the signal processing module is further configured to generate empirical features according to the information on the centroid for the positive frequencies and the information on the centroid for the negative frequencies, where the empirical features include the interferometric empirical feature, the first empirical feature and the second empirical feature.

Optionally, the signal processing module is further configured to generate the empirical features including a first feature value, a second feature value and a third feature value; the first feature value is an average frequency of a time-frequency spectrum; the second feature value is a difference between the frequency of the centroid for the positive frequencies and the frequency of the centroid for the negative frequencies in a time-frequency spectrum; and the third feature value is a difference between the time of the centroid for the positive frequencies and the time of the centroid for the negative frequencies in a time-frequency spectrum.

Optionally, the signal processing module is further configured to perform a short-time Fourier transform on a signal to obtain a Micro-Doppler time-frequency spectrum by using a preset time-frequency analysis algorithm.

In the third aspect, the present application provides an electronic apparatus for recognizing a posture of a target, including: a memory, configured to store program instructions; a processor, configured to call and execute the program instructions in the memory to perform any one of possible methods for recognizing a posture of a target described in the first aspect.

In the fourth aspect, the present application provides a storage medium, the storage medium is stored with a computer program, the computer program is configured to perform any one of the methods for recognizing a posture of a target described in the first aspect.

According to the method, apparatus and electronic equipment for recognizing a posture of a target provided by the present application, a first receiving signal and a second receiving signal upon scattering of a transmitting signal from a target to be recognized are acquired, a first baseband signal is determined according to the first receiving signal and the transmitting signal, and a second baseband signal is determined according to the second receiving signal and the transmitting signal; and a category of the posture of the target to be recognized is finally determined according to the first baseband signal and the second baseband signal. The first baseband signal and the second baseband signal carry various feature values related to the posture of the target to be recognized, including but not limited to transversal velocity information and radial velocity information, etc. By virtue of the binding among various feature values including the radial and transversal velocity information of the posture of the target, the transversal velocity information is complemented, hence, postures of the target under different azimuth angles and horizontally symmetrical postures (such as swiping from left to right and swiping from right to left) can be distinguished more accurately, thereby realizing recognition of the posture of the target with high accuracy and high stability, making the hardware cost and the algorithm complexity relatively low, and achieving good real-time interaction.

BRIEF DESCRIPTION OF DRAWINGS

To illustrate the technical solutions in the present application or in prior art clearly, drawings required in the description of the embodiment or prior art are briefly introduced. Obviously, the drawings in the following description are some embodiments of the present application, and those skilled in the art can obtain other drawings based on these drawings without paying any creative labor.

DESCRIPTION OF EMBODIMENTS

Figure 1:
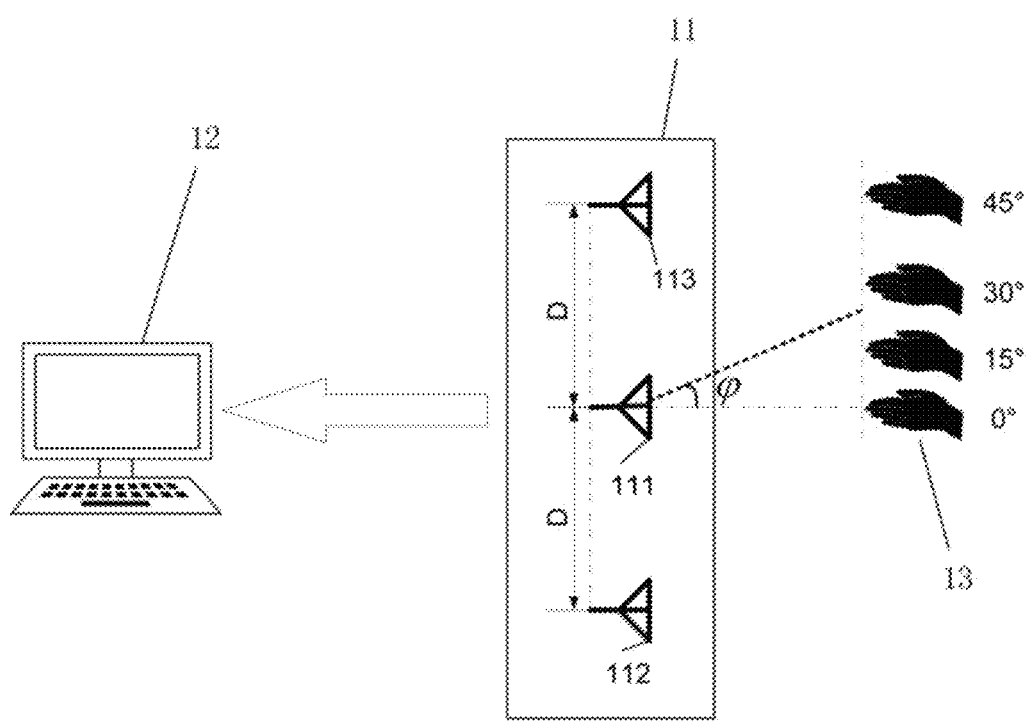
FIG. 1 is a schematic diagram of an application scenario of a method for recognizing a posture of a target provided by the present application.

The technical solutions in the embodiments of the present application are clearly and completely described in the following with reference to the drawings in the embodiments of the present application. It is obvious that the described embodiments are only part of the embodiments of the present application, but not all embodiments. All other embodiments obtained by a person of ordinary skill in the art based on the embodiments of the present application without creative labors are within the scope of the present application.

The terms "first", "second", "third", "fourth", etc. (if any) in the description and claims of the present application and drawings are used to distinguish similar objects, and do not have to be used to describe a specific order or sequence. It should be understood that the data used in this way can be interchanged under appropriate circumstances, so that the embodiments of the present application described herein can be implemented in an order other than those illustrated or described herein. In addition, the terms "including" and "having" and any variations thereof are intended to cover non-exclusive inclusions, for example, processes, methods, systems, products or apparatus that contain a series of steps or units need not be limited to those clearly listed those steps or units, but may instead include other steps or units that are not explicitly listed or inherent to these processes, methods, products, or equipment.

In prior art, a traditional recognition method uses a radar to transmit a microwave and receive an echo. Performing time-frequency analysis on the radar echo to obtain a Micro-Doppler feature of the echo, then recognizing and classifying the moving target. However, the method in which analysis is purely performed on the radar echo can only reflect a radical velocity feature of the target, rather than a transversal motion feature of the target, thereby making the accuracy of posture recognition of a target highly sensitive to an azimuth angle. When an azimuth angle of the moving target deviating from a positive direction of the radar exceeds a certain range, the accuracy of the recognition will be greatly influenced. Moreover, the radar can only obtain projection of the target's velocity along the radial direction, since the radial projection cannot reflect the transversal motion feature, thus leading to low accuracy of recognizing horizontally symmetrical gestures (such as swiping from left to right and swiping from right to left) by the radar. On the other hand, using a MIMO radar to obtain angle information of the target by applying an array antenna, so as to obtain the transversal motion feature. However, accurate angle information requires multi-antenna arrays, which is in a tradeoff relationship with hardware cost. Also, the time complexity of array signal processing is relatively high, thereby making the real-time interaction based on postures of the moving target difficult. Therefore, the traditional method for recognizing the posture of the target using a traditional radar fails to obtain the transversal motion feature, besides, the recognition accuracy is low due to the influence of the azimuth angle, the hardware cost of using the MIMO radar is high, the time complexity of array signal processing is high and the real-time interactivity is poor.

Considering the above problems, the present application provides a method and apparatus for recognizing a posture of a target, electronic equipment and a storage medium, a first receiving signal and a second receiving signal upon scattering of a transmitting signal from a target to be recognized are acquired, a first baseband signal is determined according to the first receiving signal and the transmitting signal, and a second baseband signal is determined according to the second receiving signal and the transmitting signal; and a category of the posture of the target to be recognized is finally determined according to the first baseband signal and the second baseband signal. The first baseband signal and the second baseband signal carry various feature values related to the posture of the target to be recognized, including but not limited to transversal velocity information and radial velocity information, etc. By virtue of the binding, complementation and comparison among various feature values including the radial and transversal velocity information of the posture of the target, thereby realizing recognition of postures of the target in different orientations and horizontally symmetric postures with high accuracy and high stability, making the hardware cost relatively low, and achieving good real-time interaction.

In the following embodiments of the application, a human hand is taken as a target for describing and explaining the method, apparatus and electronic equipment for recognizing a posture of a target, provided by the embodiments of the present application. FIG. 1 is a schematic diagram of an application scenario of a method for recognizing a posture of a target provided by the present application. In this scenario, a transmitting antenna 111 of a frequency-modulated continuous-wave radar 11 transmits a transmitting signal, and two receiving antennas of the frequency-modulated continuous-wave radar 11 are a first receiving antenna (i.e., a receiving antenna 112) and a second receiving antenna (i.e., a receiving antenna 113) respectively. The receiving antenna 112 and the receiving antenna 113 respectively receive the first receiving signal and the second receiving signal upon scattering of a transmitting signal from a human hand 13; subsequently, a terminal 12 acquires the above-mentioned transmitting signal, the first receiving signal and the second receiving signal from the frequency-modulated continuous-wave radar 11, and determines a gesture category i.e., a category of a posture of the human hand 13 using the method for recognizing a posture of a target provided by the present application. The terminal 12 may be, for example, a computer, a mobile phone, a tablet computer, a smart home appliance, etc.

It should be noted that the frequency-modulated continuous-wave radar of the embodiment of the present application has one transmitting antenna and two separate receiving antennas, namely an interferometric radar. However, the radar described in the present application includes but is not limited to this form of interferometric radar. It can also be a radar with multiple receiving antennas and multiple transmitting antennas combined. A radar belongs to the radar described in the present application as long as it can realize the technical solution described in the present application. In the following of the present application, the wording such as the first receiving signal and the second receiving signal, a first baseband signal and a second baseband signal, etc., actually means that at least two receiving signals and at least one transmitting signal are required, and all receiving signals are processed to obtain corresponding baseband signals, and then interferometric processing is performed on the corresponding baseband signals, and then transversal and radial velocity information of the target to be recognized are obtained by performing time-frequency analysis, and the posture of the target is recognized based thereon. Simply increasing the receiving signal in number, and/or, increasing the transmitting signal in number is still within the scope of the technical solution described in the present application, and the present application does not limit the number of receiving signals and transmitting signals in any way.

Figure 6:
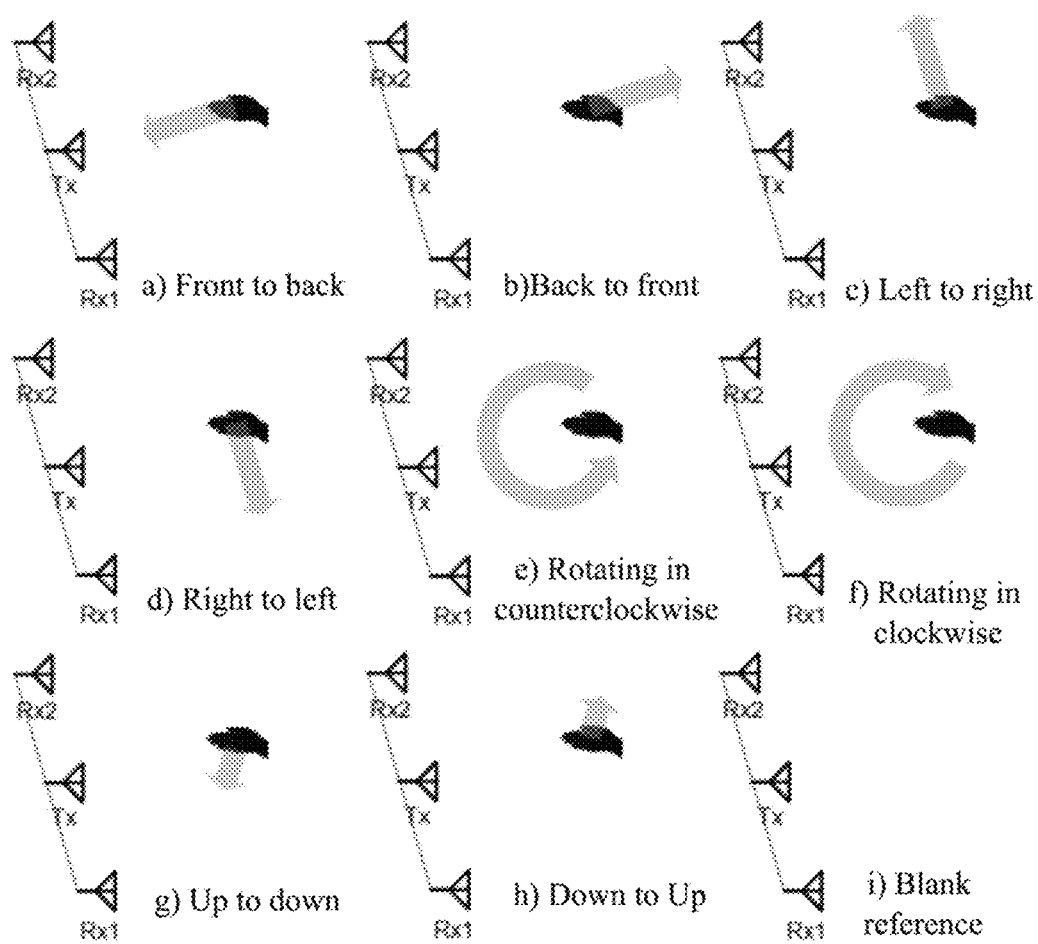
FIG. 6 is a classification diagram of postures of a target to be recognized provided by the present application.

The classification of postures of the target in the following embodiments is shown in FIG. 6, which is a classification diagram of postures of a target to be recognized provided by the present application. As shown in FIG. 6, the classifications of gestures are as follows: (a) swiping from front to back, (b) swiping from back to front, (c) swiping from left to right, (d) swiping from right to left, (e) rotating in counterclockwise, (0 rotating in clockwise, (g) swiping from up to down, (h) swiping from down to up, (i) blank reference. In the embodiment, eight gestures and a blank reference are included. The blank reference corresponds to the case where no hand moves in front of the radar. The purpose is to determine whether there is an active target to be recognized in a field of view of the radar.

It can be understood that the method provided by the embodiments of the present application can be used not only to recognize hand gesture categories, but also to recognize the categories of postures of any objects, such as posture recognition, fall recognition, etc.

In the following, an interferometric radar is taken as an example, where the interferometric radar has one transmitting antenna and two receiving antennas and can transmit and receive a continuous wave whose frequency is modulated by a specific signal, and the technical solutions of the embodiments of the present application are described in detail with specific embodiments. The following specific embodiments may be combined with each other, and the same or similar concepts or processes may not be repeated in some embodiments.

Figure 2:
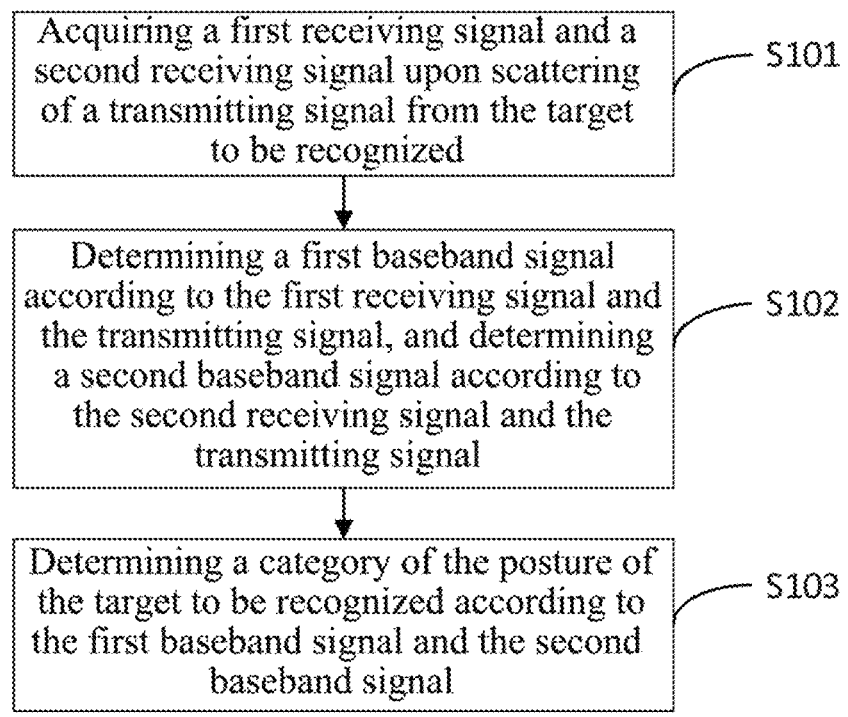
FIG. 2 is a schematic flowchart of a method for recognizing a posture of a target provided by the present application.

FIG. 2 is a schematics flowchart of a method for recognizing a posture of a target provided by the present application. This embodiment relates to a specific process of how to process a signal of an interferometric radar and then recognize a category of the posture of the target. As shown in FIG. 2, the method includes:

S101, acquiring a first receiving signal and a second receiving signal upon scattering of a transmitting signal from a target to be recognized.

In this step, the transmitting signal may specifically be a linear frequency modulated wave signal. The transmitting antenna of the interferometric radar transmits the linear frequency modulated wave signal. After the signal is scattered by the target, the first receiving signal and the second receiving signal are formed and received by the first receiving antenna and the second receiving antenna of the radar, so that the corresponding antenna obtains the first receiving signal and the second receiving signal accordingly.

In a possible situation, specifically, when a carrier frequency of the linear frequency-modulated continuous-wave transmitted by the frequency-modulated continuous-wave interferometric radar is $f_0$, the transmitting signal can be expressed by Equation (1), as follows:

$$s_T(t) = \exp(-j2\pi f_0 t) \tag{1}$$

where $f_0$ is the carrier frequency, and j is the imaginary unit.

S102, determining a first baseband signal according to the first receiving signal and the transmitting signal, and determining a second baseband signal according to the second receiving signal and the transmitting signal.

Figure 3:
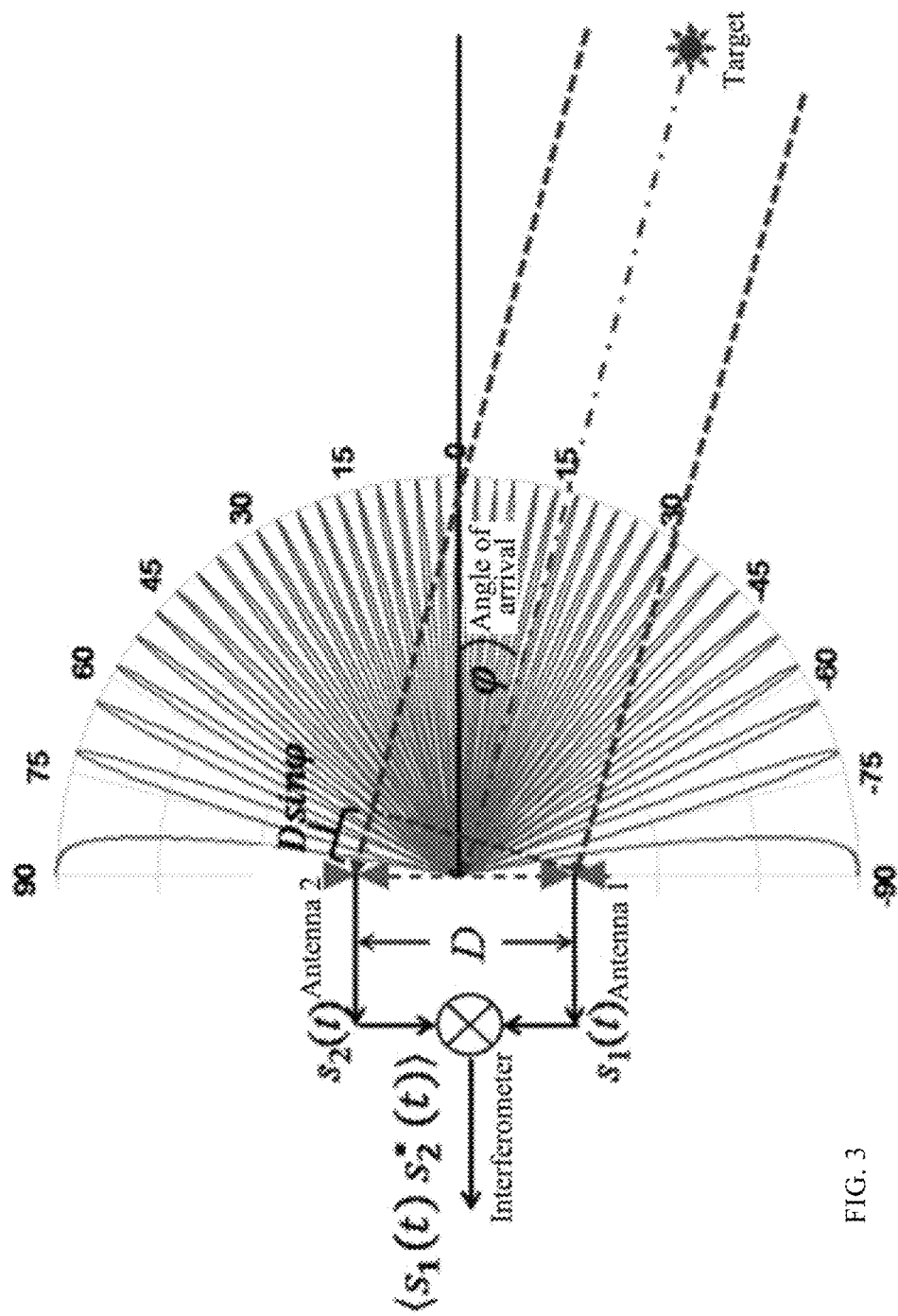
FIG. 3 is a schematic diagram of an echo receiving signal of a frequency-modulated continuous-wave interferometric radar provided by the present application.

FIG. 3 is a schematic diagram of an echo receiving signal of a frequency-modulated continuous-wave interferometric radar provided by the present application. The transmitting signal is scattered by the target to be recognized and received by two receiving antennas. The antenna 1 and antenna 2 are receiving antennas and the distance between them is D. In this step, taking the antenna 1 as the reference, the receiving signal, i.e., the first receiving signal and the transmitting signal are mixed and filtered to obtain a beat signal of the transmitting signal and the first receiving signal, that is, a first baseband signal, which can be specifically expressed by Equation (2). Under a far field assumption, compared with the antenna 1, the second receiving signal received by the antenna 2 is delayed by $\tau$. Similarly, the second receiving signal and the transmitting signal are mixed and filtered to obtain a second baseband signal, which can be specifically expressed by Equation (3):

$$S_1(t) = \exp\left(-j2\pi f_0\left(t - \frac{2R}{c}\right)\right) \tag{2}$$

$$S_2(t) = \exp\left(-j2\pi f_0\left(t - \frac{2R}{c} - \tau\right)\right) \tag{3}$$

$$= \exp\left(-j2\pi f_0\left(t - \frac{2R}{c} - \frac{D\sin\varphi}{c}\right)\right)$$

where delay $\tau = \dfrac{D\sin\varphi}{c}$,

R is a range of the target with respect to the radar, c is the speed of light, $\varphi$ is an angle of arrival of the radar's echo signal reaching the receiving antenna, that is, the azimuth angle of the target to be recognized.

S103, determining a category of the posture of the target to be recognized according to the first baseband signal and the second baseband signal.

In this step, time-frequency analysis is performed on the first baseband signal and the second baseband signal, respectively, to obtain time distribution features of each velocity component of the target to be recognized, that is, Micro-Doppler features, and then feature values corresponding to specific postures can be extracted therefrom, including but not limited to: a Micro-Doppler spectrum of the baseband signal, radial velocity information, transversal velocity information, a centroid for positive frequencies, a centroid for negative frequencies, a posture duration, a maximum positive frequency and its time, a minimum negative frequency and its time, an average frequency, a frequency bandwidth, a frequency variance or a standard deviation, etc.

In a possible design, frequency peaks of the first baseband signal and the second baseband signal are calculated as a first frequency shift and a second frequency shift of the target to be recognized, and a difference frequency signal between the first receiving signal and the second receiving signal is calculated by Equation (4), and then Equation (5) is used to calculate a transversal velocity of the target to be recognized. Equation (4) and Equation (5) are as follows:

$$f_a = f_{d1} - f_{d2} \tag{4}$$

$$\omega = \frac{f_a \lambda_{t_s}}{D} \tag{5}$$

where $f_a$ is the difference frequency signal, $f_{d1}$ is the first frequency shift, $f_{d2}$ is the second frequency shift, co is a tangential velocity, i.e., the transversal velocity, D is the baseline distance between the two receiving antennas, $\lambda_{t_s}$ corresponds to a carrier wavelength of the radar at the time $t = t_s + nT$, T is a sweep period.

Optionally, it is also possible to iteratively combine the first baseband signal and the second baseband signal, perform different operations such as difference, quotient, addition, multiplication, convolution, and interferometric processing, and then perform time-frequency analysis to obtain transversal and radial motion information feature values which can be used to distinguish different postures.

Obviously, different postures correspond to one or more different feature values. Based on this feature value or a set of feature values, a combination comparison or matching comparison is performed. In the embodiment of the present application, the transversal velocity feature and the radial velocity feature of the target to be recognized interact with each other, complement each other, and supplement the transversal velocity information, in this way, postures of the target under different azimuth angles and horizontally symmetric motions (such as swiping from left to right and swiping from right to left) may be distinguished more accurately, the transversal velocity feature and the radial velocity feature can form a specific set of recognition classification vectors, and establish a correspondence table or a corresponding function relationship with postures (i.e., gestures) of the target to be recognized, to obtain classification categories of the postures of the target to be recognized.

The present embodiment provides a method for recognizing a posture of a target, a first receiving signal and a second receiving signal upon scattering of a transmitting signal from a target to be recognized are acquired, a first baseband signal is determined according to the first receiving signal and the transmitting signal, and a second baseband signal is determined according to the second receiving signal and the transmitting signal; and a category of the posture of the target to be recognized is finally determined according to the first baseband signal and the second baseband signal. The first baseband signal and the second baseband signal carry various feature values related to the posture of the target to be recognized, including but not limited to transversal velocity information and radial velocity information, etc. By virtue of the binding among various feature values including the radial and transversal velocity information of the posture of the target, the transversal velocity information is complemented, hence, postures of the target under different azimuth angles and horizontally symmetrical postures (such as swiping from left to right and swiping from right to left) can be distinguished more accurately, thereby realizing recognition of the posture of the target with high accuracy and high stability, making the hardware cost and the algorithm complexity relatively low, and achieving good real-time interaction.

It should be noted that the embodiment does not limit the specific method for mining feature values related to the posture of the target to be recognized, the method falls into the scope discussed in the embodiment as long as it can obtain the transversal velocity feature and the radial velocity feature of the target to be tested.

Figure 4:
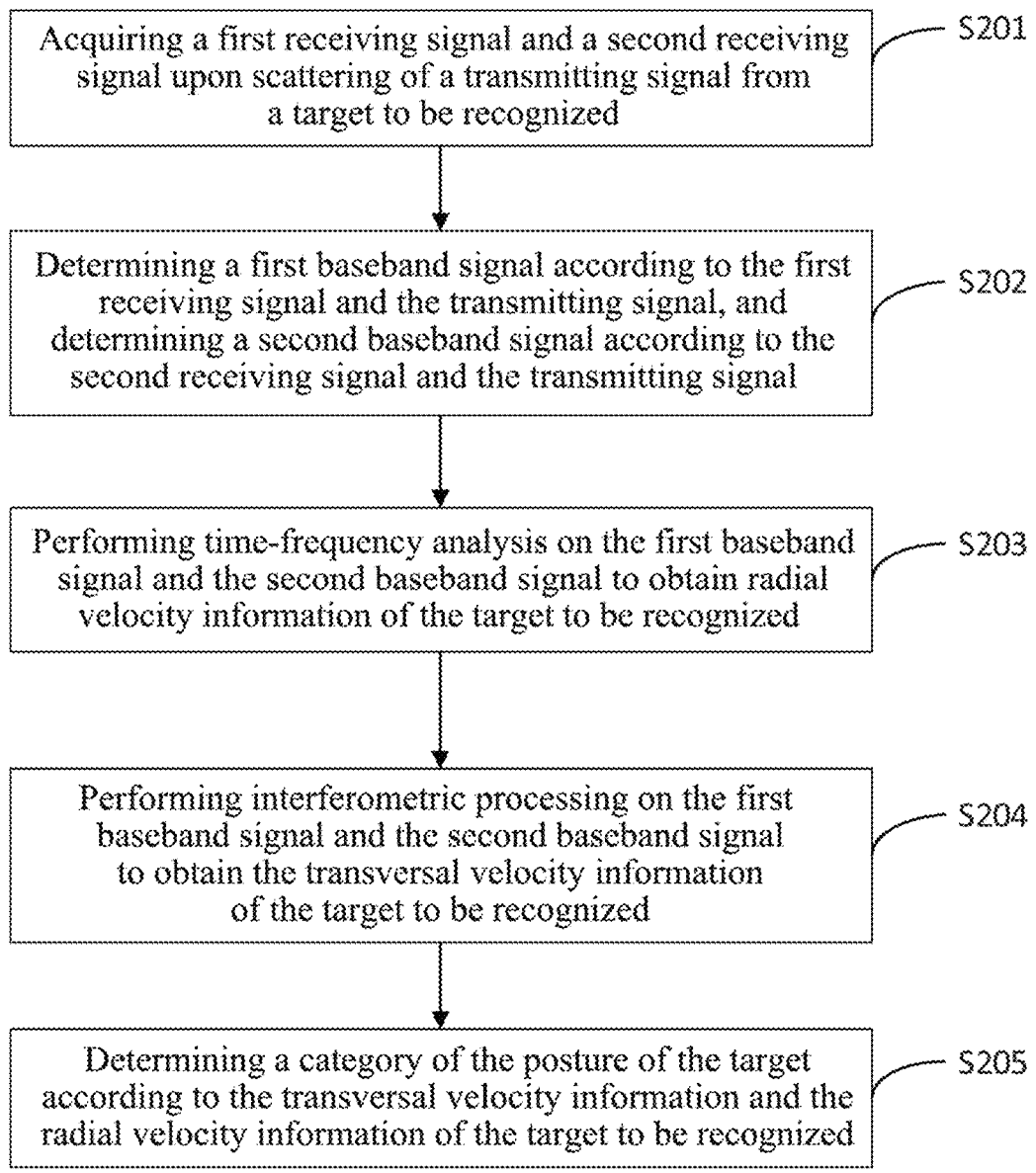
FIG. 4 is a schematic flowchart of another method for recognizing a posture of a target provided by the present application.

FIG. 4 is a schematic flowchart of another method for recognizing a posture of a target provided by the present application. As shown in FIG. 4, the method for recognizing a posture of a target provided in the embodiment includes following specific steps:

S201, acquiring a first receiving signal and a second receiving signal upon scattering of a transmitting signal from a target to be recognized; and S202, determining a first baseband signal according to the first receiving signal and the transmitting signal, and determining a second baseband signal according to the second receiving signal and the transmitting signal.

Reference may be made to steps S101 to S102 shown in FIG. 2 for technical terms, technical effects, technical features, and optional implementations of steps S201 to S202, and the repeated content will not be repeated herein again.

S203, performing time-frequency analysis on the first baseband signal and the second baseband signal to obtain radial velocity information of the target to be recognized.

In this step, time-frequency analysis is performed on the first baseband signal and the second baseband signal. It can be understood that the first baseband signal and the second baseband signal are time-domain signals, and the time-domain signals need to be converted into time-frequency domain signals so as to obtain their corresponding time-frequency spectrums. There are many ways for implementing conversions between a time domain and a time frequency domain, such as the short time Fourier transform (STFT), the Gabor transform, the fractional Fourier transform (FrFT), the wavelet transform (WT), etc.

In a possible case, the short-time Fourier transform (STFT) is performed on the first baseband signal and the second baseband signal, a first Micro-Doppler time-frequency spectrum is obtained based on the first baseband signal and a second Micro-Doppler time-frequency spectrum is obtained based on the second baseband signal. From the Micro-Doppler time-frequency spectrums, the Micro-Doppler features of the target to be recognized are obtained, that is, time distribution features of the velocity components of the target to be recognized, thereby obtaining the radial velocity information of the target to be recognized.

Specifically, it may be: down-sampling the radar signal of the frequency-modulated continuous-wave interferometric radar in such a manner that the sampling period $t_s$ equals to the sweep period T or the ratio between them is 1:50, then, the short-time Fourier transform is performed on the first baseband signal and the second baseband signal, and peak values are extracted as a third frequency shift and a fourth frequency shift induced by the posture of the target to be recognized.

Subsequently, a first radial velocity and a second radial velocity of the target can be calculated using Equation (6) and Equation (7), and Equation (6) and Equation (7) are as follows:

$$v_{r1} = \frac{cf_{d3}}{2f_0} \quad (6)$$

$$v_{r2} = \frac{cf_{d4}}{2f_0} \quad (7)$$

where $v_{r1}$ is the first radial velocity, $v_{r2}$ is the second radial velocity, c is the speed of light, $f_{d3}$ is the third frequency shift, $f_{d4}$ is the fourth frequency shift, and $f_0$ is the central carrier frequency.

S204, performing interferometric processing on the first baseband signal and the second baseband signal to obtain the transversal velocity information of the target to be recognized.

In this step, the first baseband signal and the second baseband signal are interfered in an interferometer to obtain an interferometric signal. The generated response, that is, the interferometric processing and its result can be expressed by Equation (8), as follows:

$$S_I(t) = \langle S_1(t) * S_2^*(t) \rangle \quad (8)$$

$$= \exp\left(\frac{j2\pi f_0 D \sin\varphi}{c}\right)$$

where $S_I(t)$ is the interferometric signal, $S_1(t)$ is the first baseband signal, $S_2(t)$ is the second baseband signal, c is the speed of light, D is the baseline length between the two receiving antennas, $\varphi$ is the azimuth angle of the target to be recognized, and $f_0$ is the central carrier frequency.

The interferometric frequency induced by the transversal velocity is a time derivative of the phase term in Equation (8), which can be expressed by Equation (9), as follows:

$$f_I(t) = \frac{1}{2\pi} \frac{d}{dt}\left(\frac{2\pi f_0 D \sin\varphi}{c}\right) \quad (9)$$

$$= \frac{f_0 D \omega \cos\varphi}{c}$$

$$= \frac{D\omega \cos\varphi}{\lambda_0}$$

where $\lambda_0$ is a wavelength of a carrier signal, D is the baseline distance between the two receiving antennas, and $$\omega = \frac{d\varphi}{dt}$$

is an angular velocity measured with respect to the position of the radar.

The transversal velocity is proportional to the angular velocity, i.e., $v_t = \omega R$, where R is the distance of the target with respect to the radar. Therefore, in the following, unless otherwise specified, no distinction will be made between the angular velocity and the transversal velocity. Obviously, the phase and frequency components of the interferometric signal can reflect the azimuth angle $\varphi$ and the angular velocity $\omega$, respectively. By performing time-frequency analysis on the interferometric signal, the transversal motion feature of the gesture can be obtained.

S205, determining a category of the posture of the target to be recognized according to the transversal velocity information and the radial velocity information of the target to be recognized.

In this step, taking the right opposite side of the interferometric radar as a reference zero azimuth angle, the transversal velocity information includes the azimuth angle φ and the angular velocity ω. For the target to be recognized under different azimuth angles, the corresponding angular velocity, i.e., the transversal velocity, will change accordingly, and the relationship between them is calculated according to Equation (9) in the previous step, in this way, the postures of the target under different azimuth angles can be classified, thereby improving the recognition accuracy of the postures of the target to be recognized under different azimuth angles.

In addition, the radial velocity is the projection of the velocity of the target to be recognized along the radial direction. For some horizontally symmetrical motions, that is, the motions that are distinct in the transversal direction but with similar radial projections, it is necessary to introduce transversal velocity information. By combining the transversal velocity information with the radial velocity information, for example, forming a synthesized velocity vector group, and then performing calculations on this vector group, recognition classification results corresponding to different posture classifications can be obtained.

This embodiment provides a method for recognizing a posture of a target, a first receiving signal and a second receiving signal upon scattering of a transmitting signal from a target to be recognized are acquired, then a first baseband signal is determined according to the first receiving signal and the transmitting signal, and a second baseband signal is determined according to the second receiving signal and the transmitting signal, and then time-frequency analysis is performed on the first baseband signal and the second baseband signal to obtain radial velocity information of the target to be recognized, then interferometric processing is performed on the first baseband signal and the second baseband signal to obtain transversal velocity information of the target to be recognized, and finally a category of the posture of the target to be recognized is determined according to the transversal velocity information and the radial velocity information of the target to be recognized. By virtue of the binding among various feature values including the radial and transversal velocity information of the posture of the target, the transversal velocity information is complemented, hence, postures of the target under different azimuth angles and horizontally symmetrical postures (such as swiping from left to right and swiping from right to left) can be distinguished more accurately, thereby realizing recognition of the posture of the target with high accuracy and high stability, making the hardware cost and the algorithm complexity relatively low, and achieving good real-time interaction.

Figure 5:
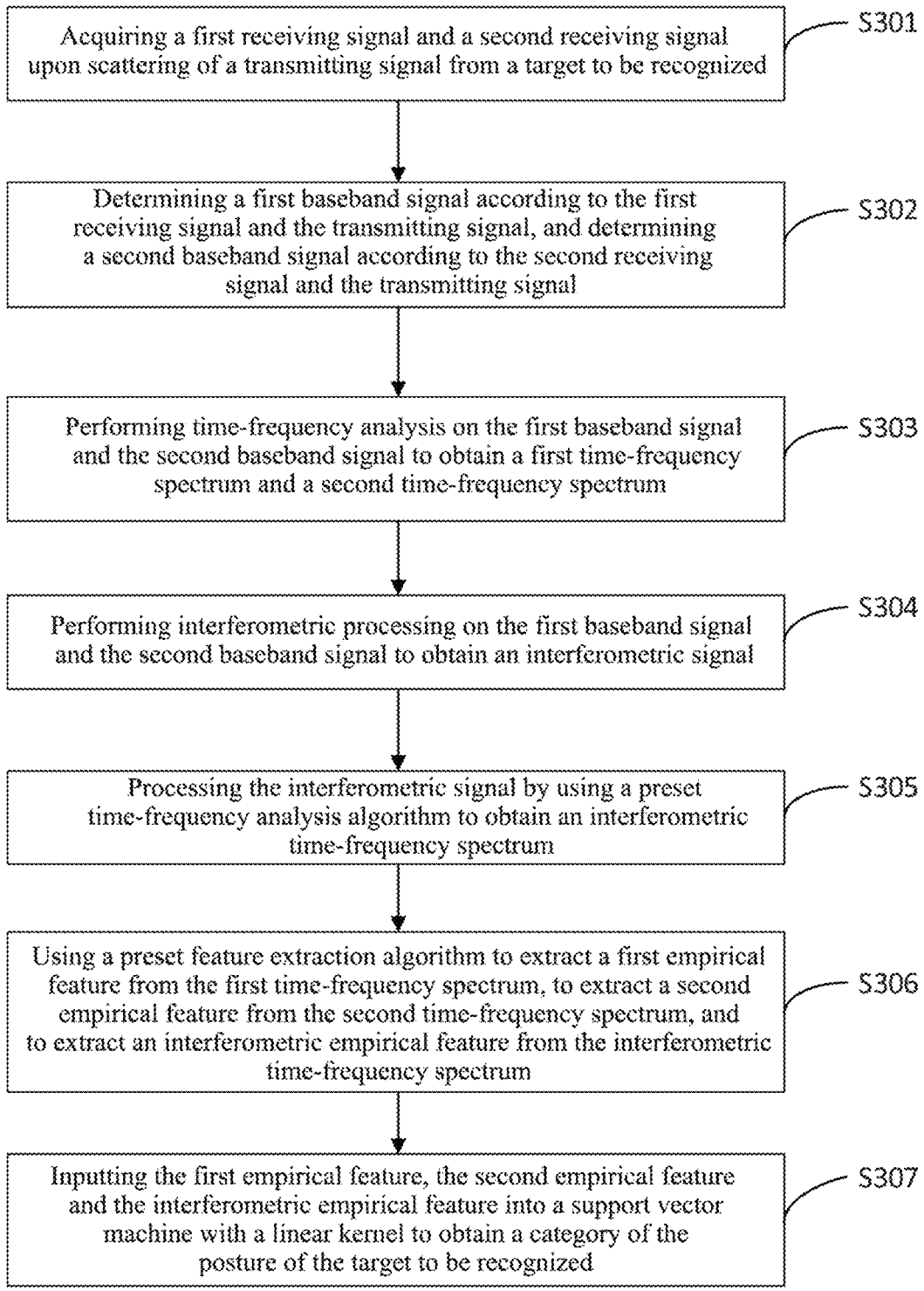
FIG. 5 is a schematic flowchart of yet another method for recognizing a posture of a target provided by the present application.

FIG. 5 is a schematic flowchart of yet another method for recognizing a posture of a target provided by the present application. In the embodiment, a target to be recognized is a human hand, and the posture of the target to be recognized is a gesture. As shown in FIG. 5, the method for recognizing a posture of a target provided in the embodiment includes following specific steps:

S301, acquiring a first receiving signal and a second receiving signal upon scattering of a transmitting signal from a target to be recognized; and S302, determining a first baseband signal according to the first receiving signal and the transmitting signal, and determining a second baseband signal according to the second receiving signal and the transmitting signal.

Reference may be made to steps S101-S102 shown in FIG. 2 for technical terms, technical effects, technical features, and optional implementations of steps S301-S302, which will not be repeated herein again.

S303, performing time-frequency analysis on the first baseband signal and the second baseband signal to obtain a first time-frequency spectrum and a second time-frequency spectrum.

The first baseband signal and the second baseband signal are time-domain signals, and the time-domain signals need to be converted into time-frequency-domain signals. Reference may be made to step S203 of FIG. 4 for various conversion methods, which will not be repeated herein again.

In this step of the embodiment, the short-time Fourier transform is performed on the first baseband signal to obtain a Micro-Doppler time-frequency spectrum, that is, the first time-frequency spectrum, and the short-time Fourier transform is performed on the second baseband signal to obtain a Micro-Doppler time-frequency spectrum, that is, the second time-frequency spectrum. The time-frequency spectrum refers to a spectrum with records in two dimensions (time and frequency). That is, coordinates of points in the time-frequency spectrum are composed of times and frequencies, as shown in FIG. 7 and FIG. 8.

Figure 7:
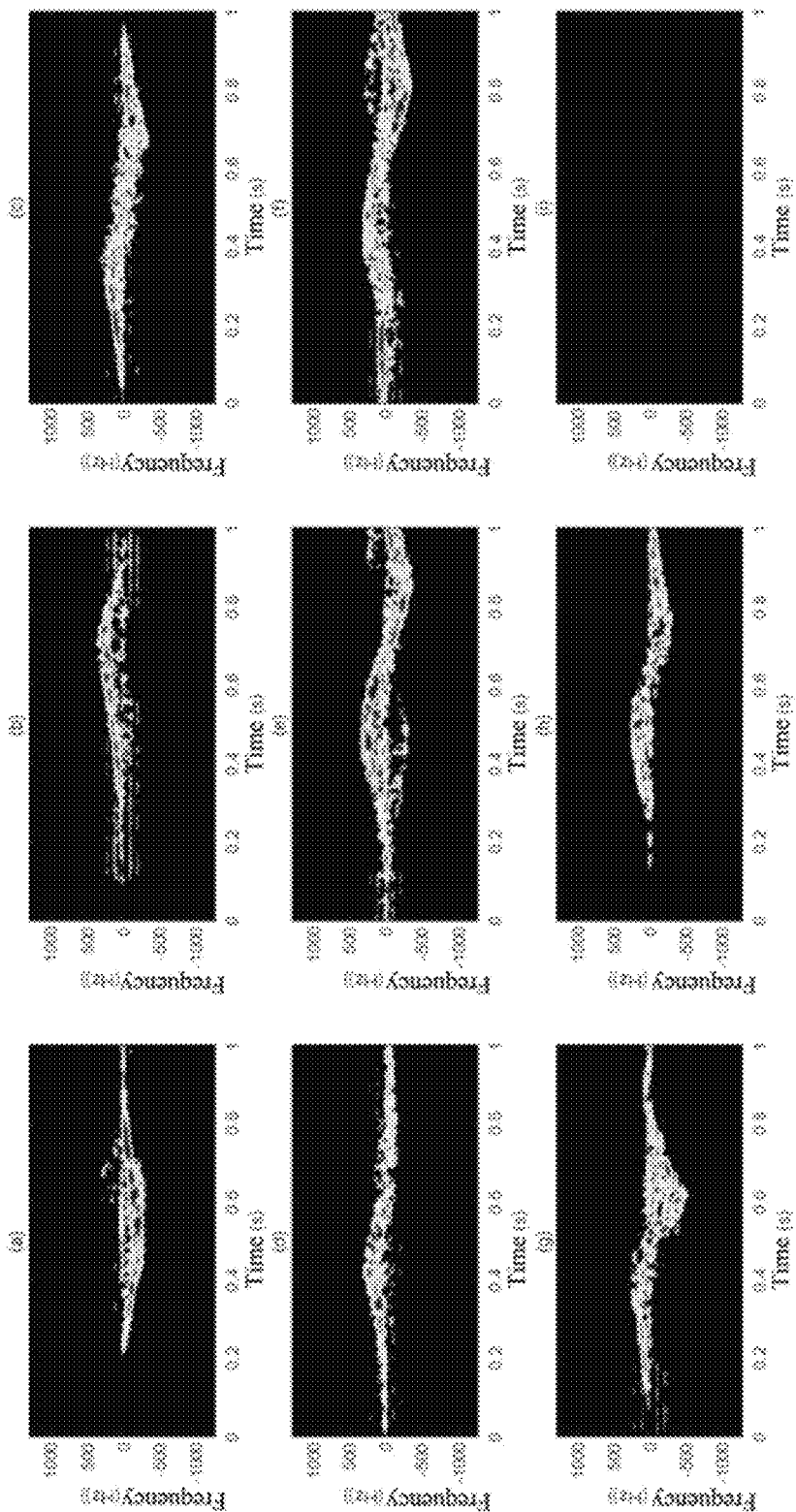
FIG. 7 is a first time-frequency spectrum provided by the present application.
Figure 8:
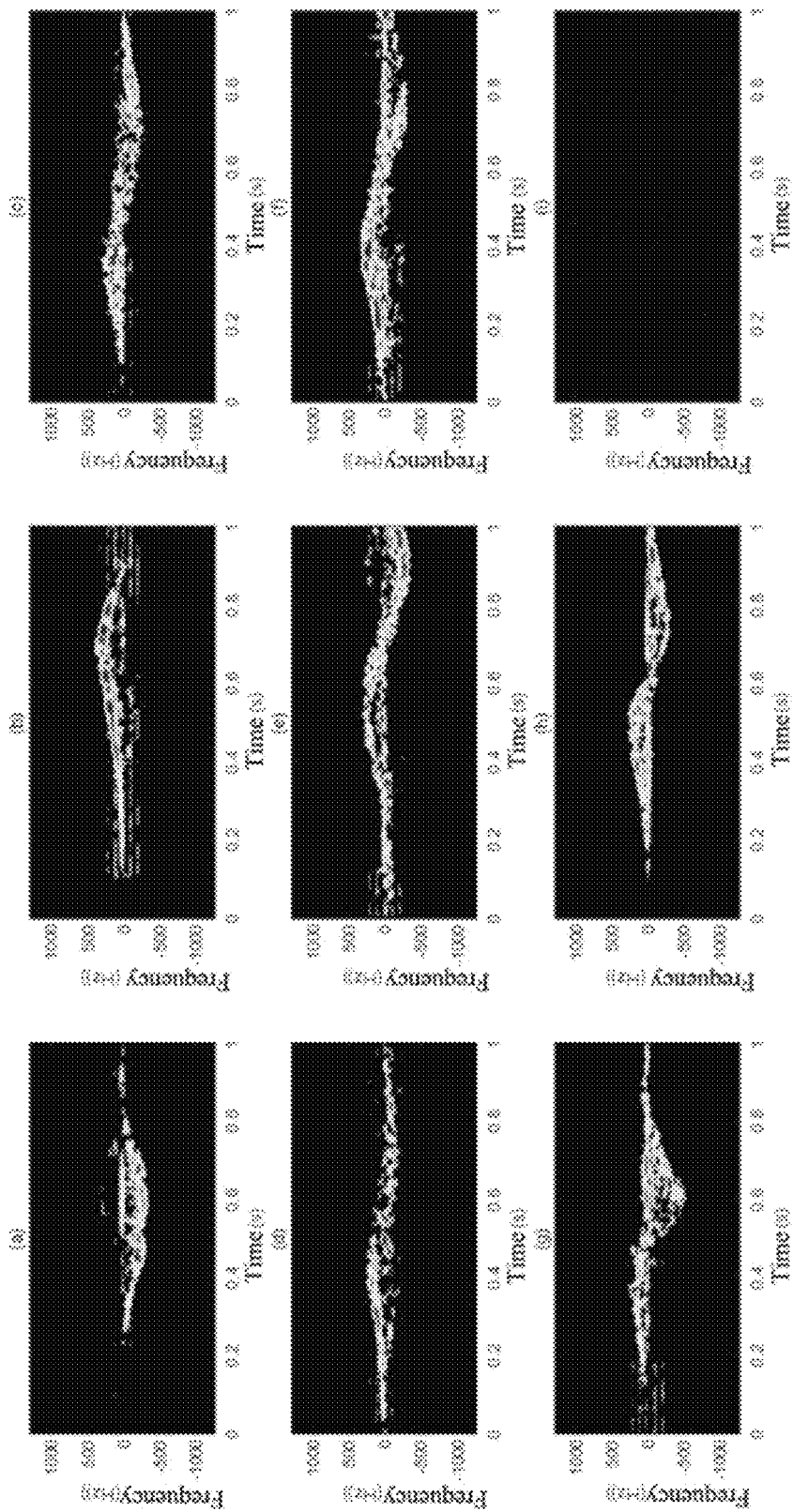
FIG. 8 is a second time-frequency spectrum provided by the present application.

FIG. 7 is a first time-frequency spectrum provided by the present application. FIG. 8 is a second time-frequency spectrum provided by the present application. As shown in FIGS. 7 and 8, (a) to (i) are the nine gesture categories corresponding to FIG. 6, and dark areas surrounded by white parts are the highest portions of positive frequencies generated by human hand movements. Gray transitional areas among the white parts are the negative frequencies generated by human hand movements. The abscissa of each time-frequency spectrum is time and the ordinate is frequency. Each point in the figure represents the frequency of the gesture at that position at a certain time. As shown in the figures, each gesture has its own specific time-frequency spectrum, and categories of the gestures can be recognized according to the time-frequency spectrums.

S304, performing interferometric processing on the first baseband signal and the second baseband signal to obtain an interferometric signal.

Reference may be made to step S204 shown in FIG. 4 for technical terms, technical effects, technical features, and optional implementations of this step, and the repeated content will not be repeated herein again.

S305, processing the interferometric signal by using a preset time-frequency analysis algorithm to obtain an interferometric time-frequency spectrum.

In this step, the short-time Fourier transform is performed on the interferometric signal to obtain the Micro-Doppler time-frequency spectrum of the interferometric signal, that is, the interferometric time-frequency spectrum.

Figure 9:
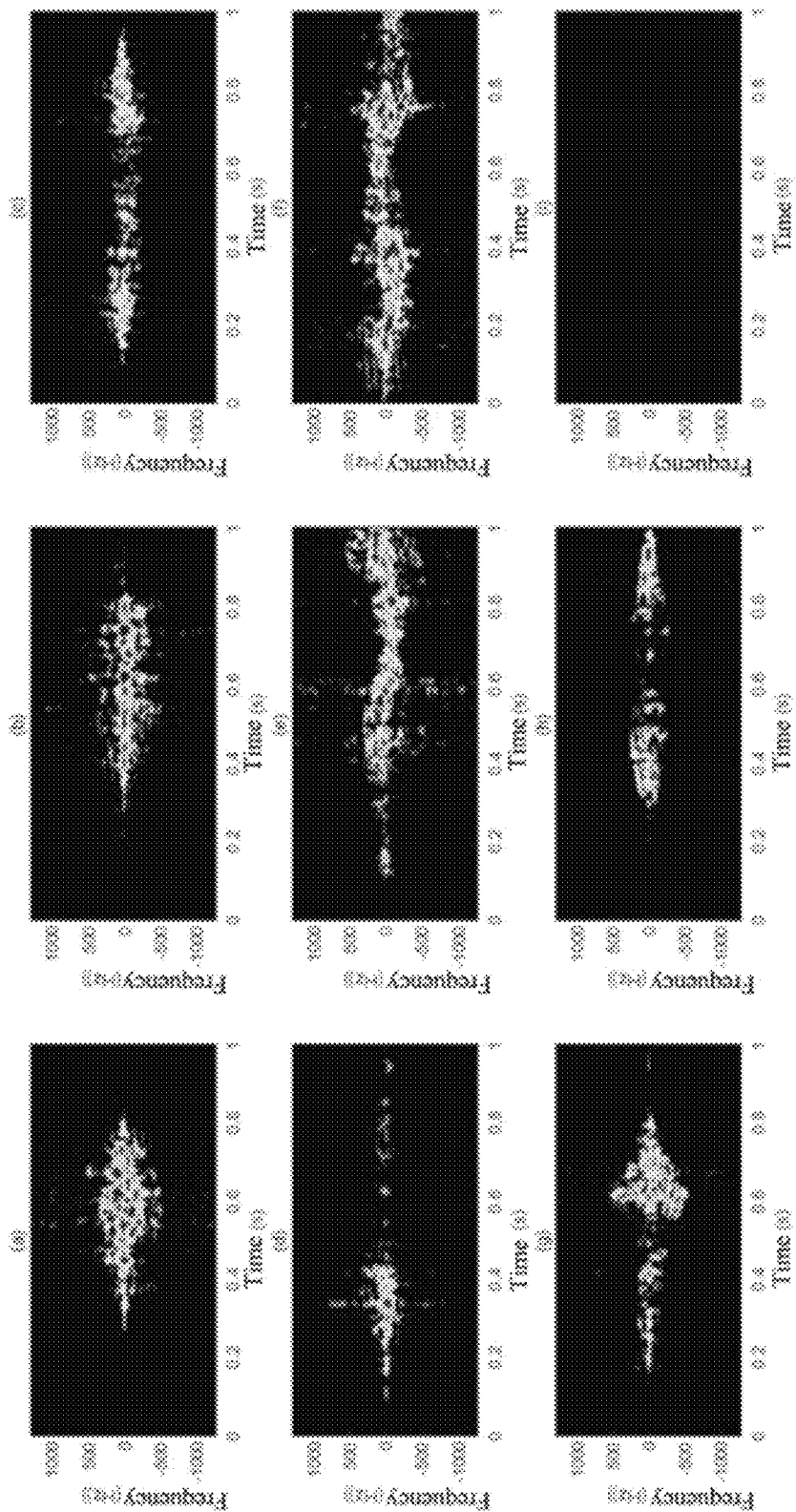
FIG. 9 is an interferometric time-frequency spectrum provided by the present application.

FIG. 9 is an interferometric time-frequency spectrum provided by the present application. As shown in FIG. 9, (a) to (i) are the nine gesture categories corresponding to FIG. 6, and dark areas surrounded by white parts are the highest portions of positive frequencies generated by human hand movements. Gray transitional areas among the white parts are the negative frequencies generated by human hand movements. The abscissa of each time-frequency spectrum is time and the ordinate is frequency. Each point in the figure represents the frequency of the gesture at that position at a certain time. Compared with FIG. 7 and FIG. 8, the interferometric time-frequency spectrum varies greatly with respect to the frequency spectrum of the corresponding gesture, and can thus be used as supplementary information for gesture recognition to improve the accuracy of gesture recognition.

It should be noted that the content in step S303 can also be executed together in this step.

S306, using a preset feature extraction algorithm to extract a first empirical feature from the first time-frequency spectrum, to extract a second empirical feature from the second time-frequency spectrum, and to extract an interferometric empirical feature from the interferometric time-frequency spectrum.

Figure 10:
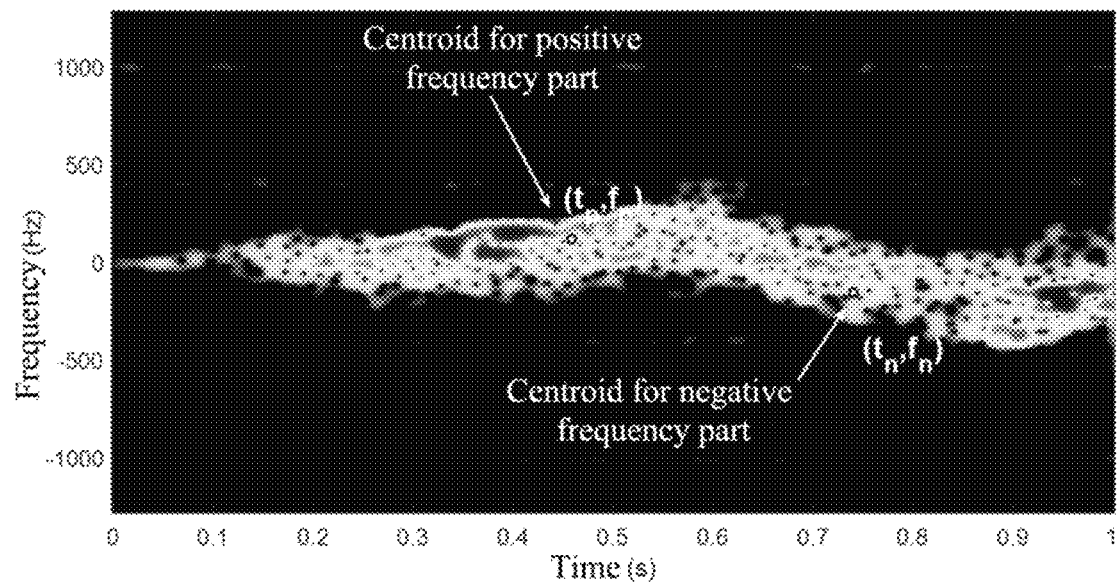
FIG. 10 is a map depicting locations of centroids of positive and negative frequency parts in the time-frequency spectrum provided by the present application.

In this step, with respect to the preset feature extraction algorithm, in a possible design, specifically, in each time-frequency spectrum including a first time-frequency spectrum, a second time-frequency spectrum, and an interferometric time-frequency spectrum, calculating a coordinate of a centroid for positive frequencies and a coordinate of a centroid for negative frequencies in the time-frequency spectrum, which can be expressed as $(t_p, f_p)$ and $(t_n, f_n)$, respectively, where $t_p$ is time of the centroid for the positive frequencies and $t_n$ is time of the centroid for the negative frequencies, $f_p$ is a frequency of the centroid for the positive frequencies, and $f_n$ is a frequency of the centroid for the negative frequencies. The positive frequency refers to a frequency when the target to be recognized moves toward a location of the radar, and the negative frequency refers to the frequency when the target to be recognized moves away from the location of the radar. FIG. 10 is a map depicting locations of centroids of positive and negative frequency parts in the time-frequency spectrum provided by the present application. As shown in FIG. 10, the centroid for the positive frequencies and the centroid for the negative frequencies can be determined according to a preset centroid calculation algorithm in the time-frequency spectrum. The calculation algorithm of the centroid is not limited herein.

The centroid for the positive frequencies and the centroid for the negative frequencies can be used to calculate empirical features of each time time-frequency spectrum, that is, calculating a first empirical feature for the first time-frequency spectrum, calculating a second empirical feature for the second time-frequency spectrum, and calculating an interferometric empirical feature for the interferometric time-frequency spectrum.

Optionally, the empirical features for each time-frequency spectrum may include: a first feature value, a second feature value, and a third feature value. The first feature value is average frequencies of each time-frequency spectrum, which can be expressed by Equation (10), specifically as:

$$F_1 = \frac{\sum_{t_i, f_j} f_j |s(t_i, f_j)|}{\sum_{t_i, f_j} |s(t_i, f_j)|} \quad (10)$$

where $F_1$ is the first feature value, and $S(t_i, f_j)$ is a complex value corresponding to the frequency $f_j$ at time $t_i$ in the time-frequency spectrum.

The second feature value is a frequency difference between the frequency of the centroid for the positive frequencies and the frequency of the centroid for the negative frequencies in the time-frequency spectrum, which can be expressed by Equation (11), as follows:

$$F_2 = f_p - f_n \quad (11)$$

where $F_2$ is the second feature value, $f_p$ is the frequency of the centroid for the positive frequencies, and $f_n$ is the frequency of the centroid for the negative frequencies.

The third feature value is a time difference between the time of the centroid for the positive frequencies and the time of the centroid for the negative frequencies in the time-frequency spectrum, which can be expressed by Equation (12), as follows:

$$F_3 = t_p - t_n \quad (12)$$

where $F_3$ is the third feature value, $t_p$ is the time of the centroid for the positive frequencies, and $t_n$ is the time of the centroid for the negative frequencies.

The three feature values of the first empirical feature and the three feature values of the second empirical feature can be used to express the radial velocity feature information of the target to be recognized, and the three feature values of the interferometric empirical feature can be used to express the transversal velocity feature information of the target to be recognized.

Figure 11:
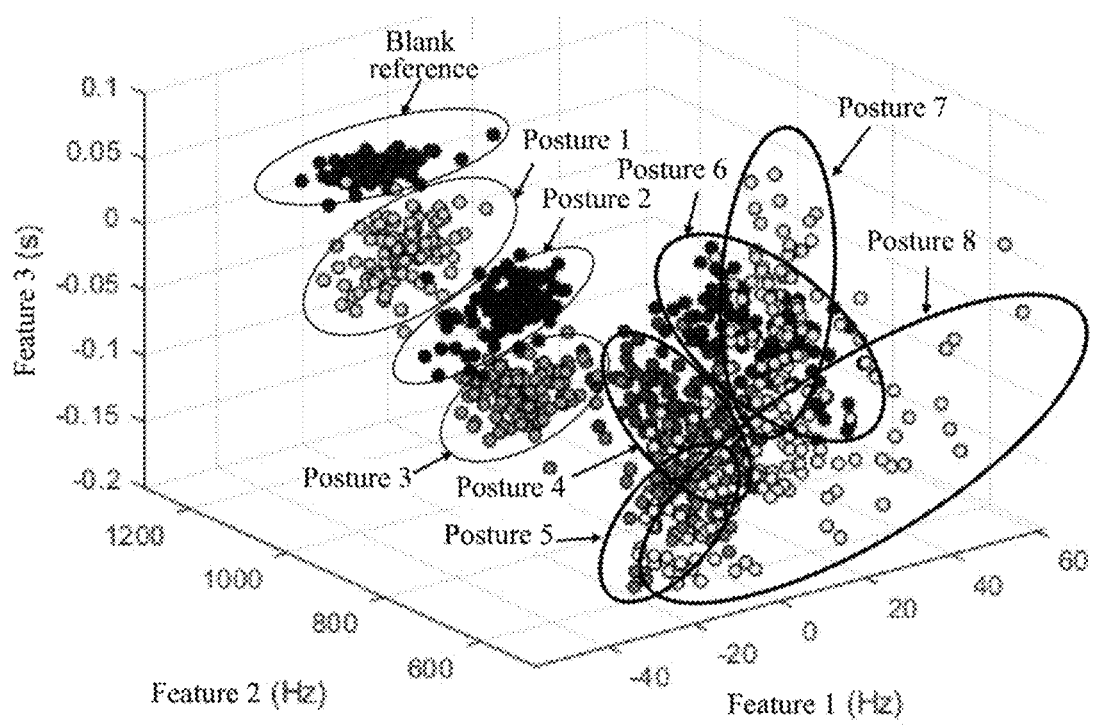
FIG. 11 is a distribution diagram of radial empirical features of test samples of the target to be recognized provided by the present application.
Figure 12:
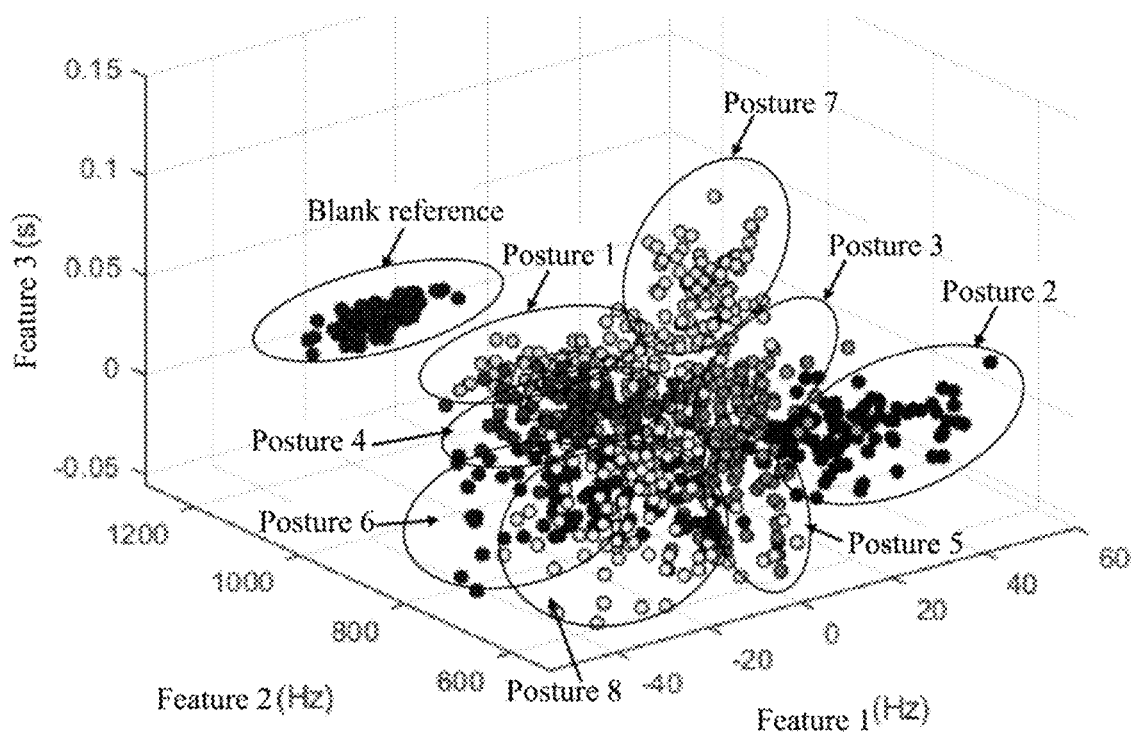
FIG. 12 is a distribution diagram of transversal empirical features of test samples of the target to be recognized provided by the present application.
Figure 13A:
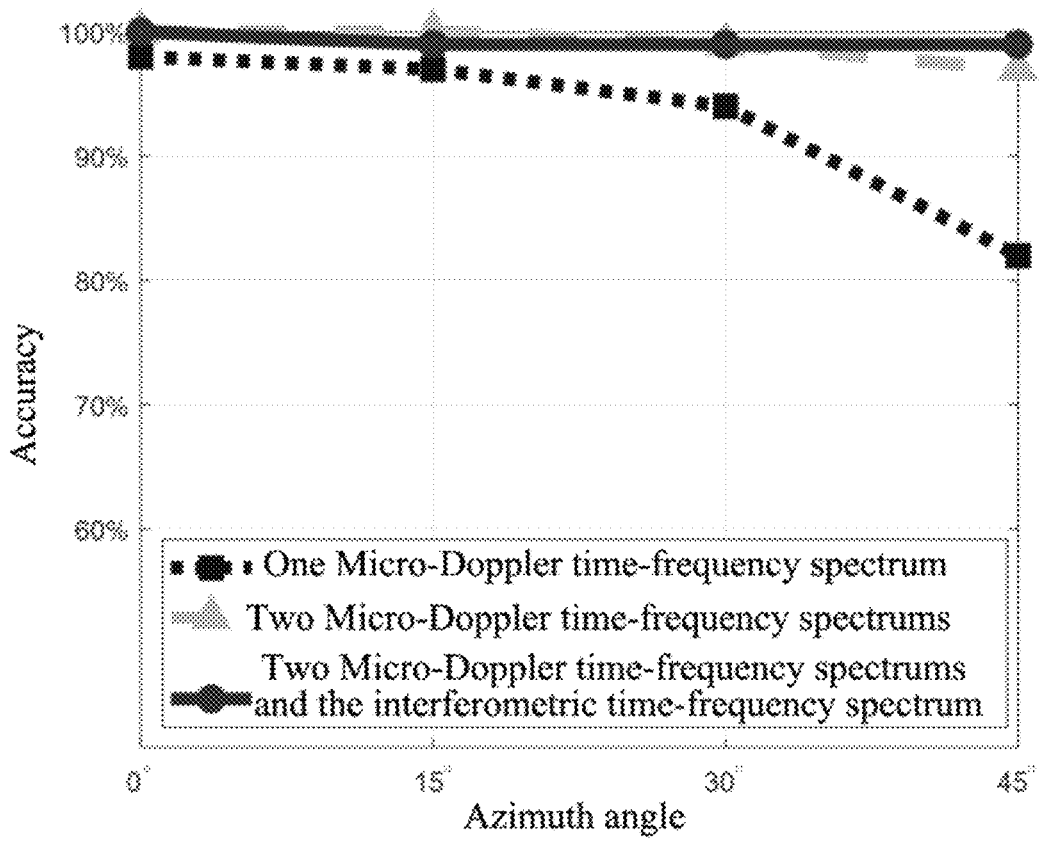
FIGS. 13a to 13i are relationship diagrams between recognition accuracy and azimuth angle of multiple gestures provided by the present application.
Figure 13B:
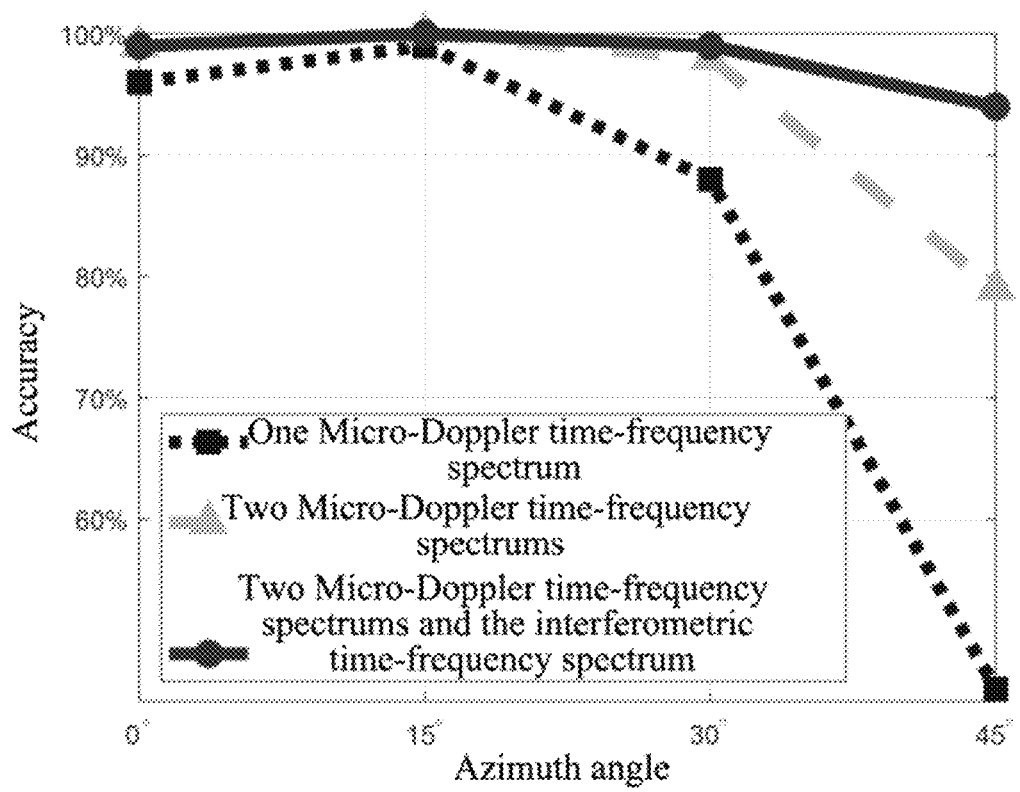
Figure 13C:
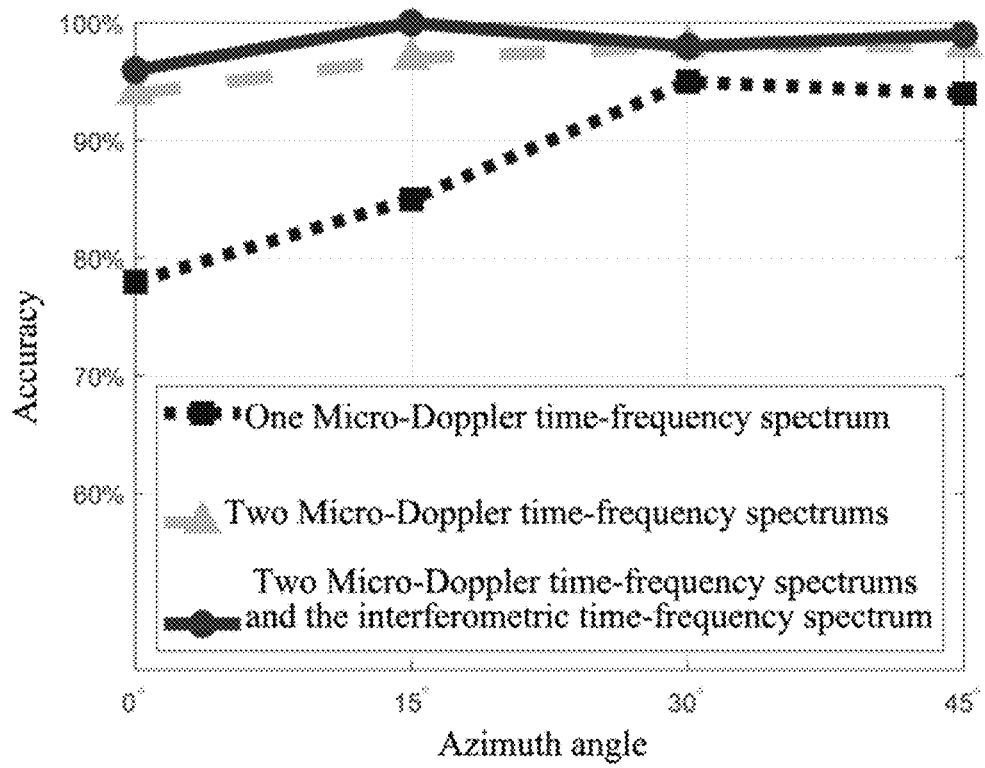
Figure 13D:
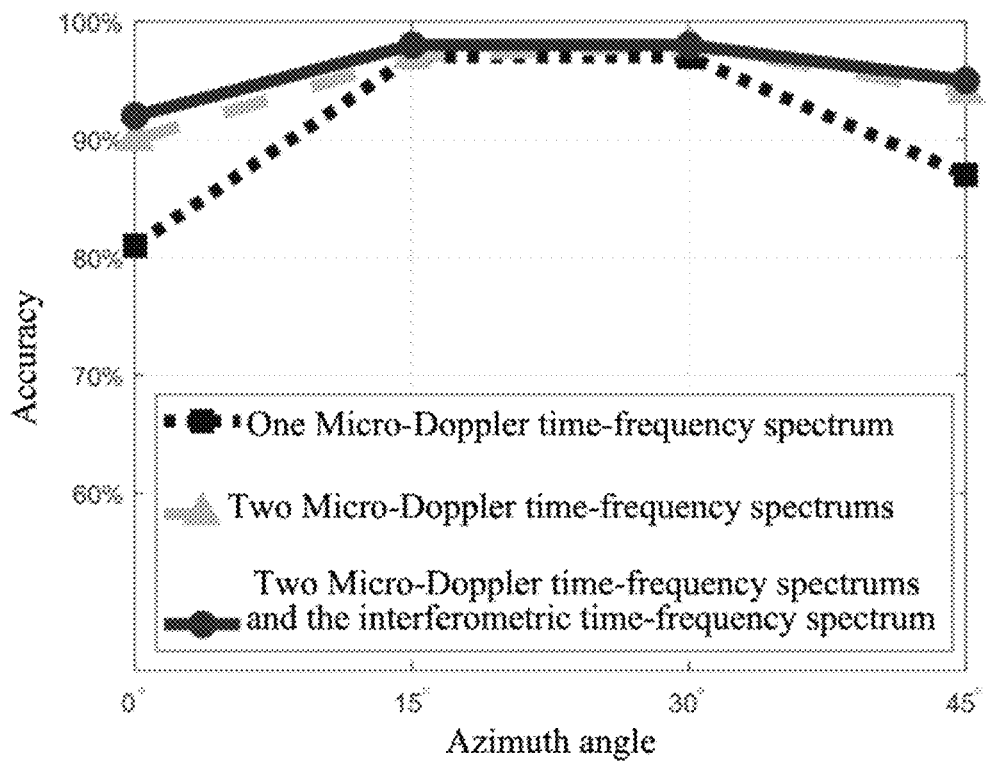
Figure 13E:
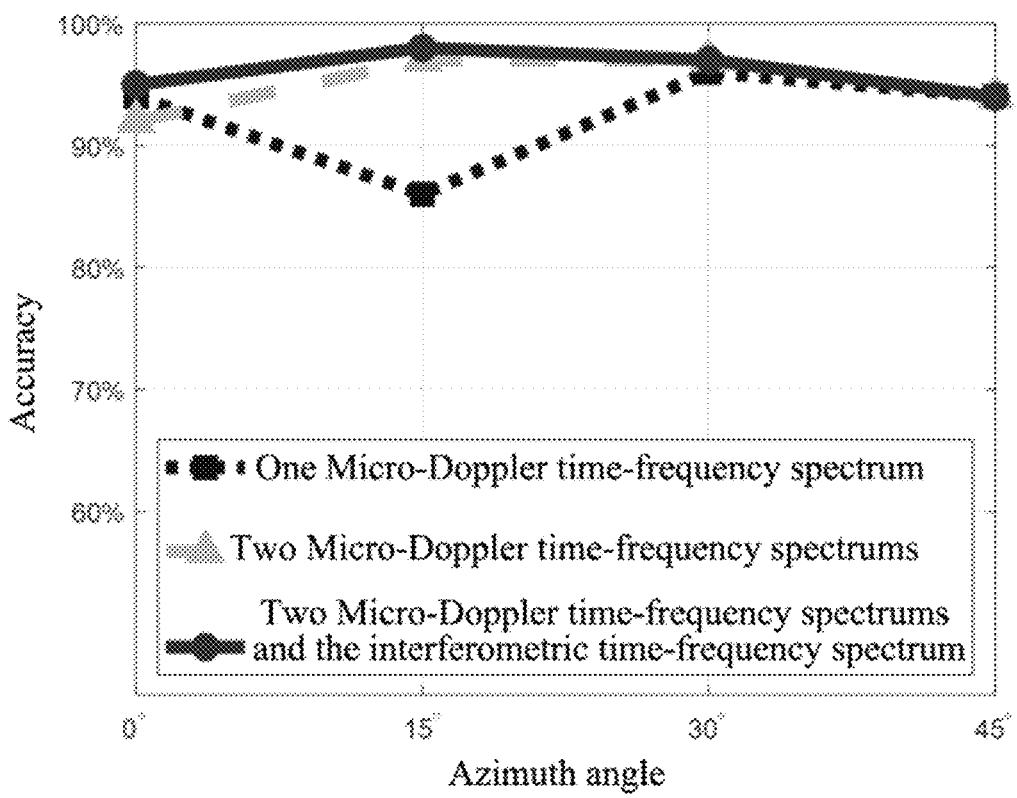
Figure 13F:
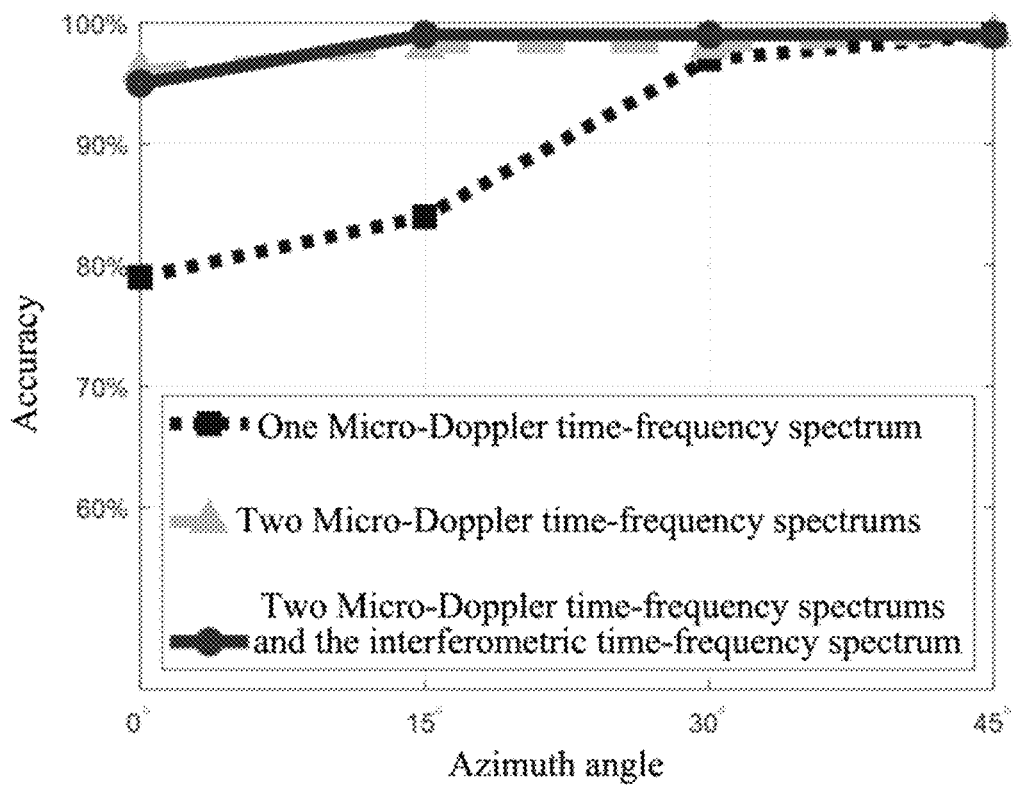
Figure 13G:
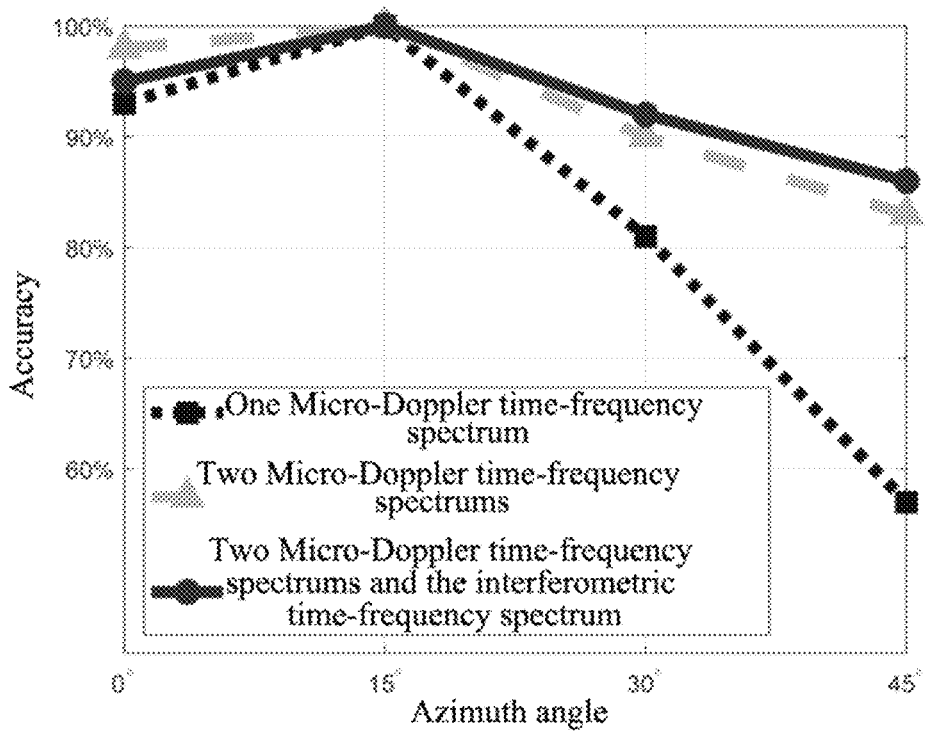
Figure 13H:
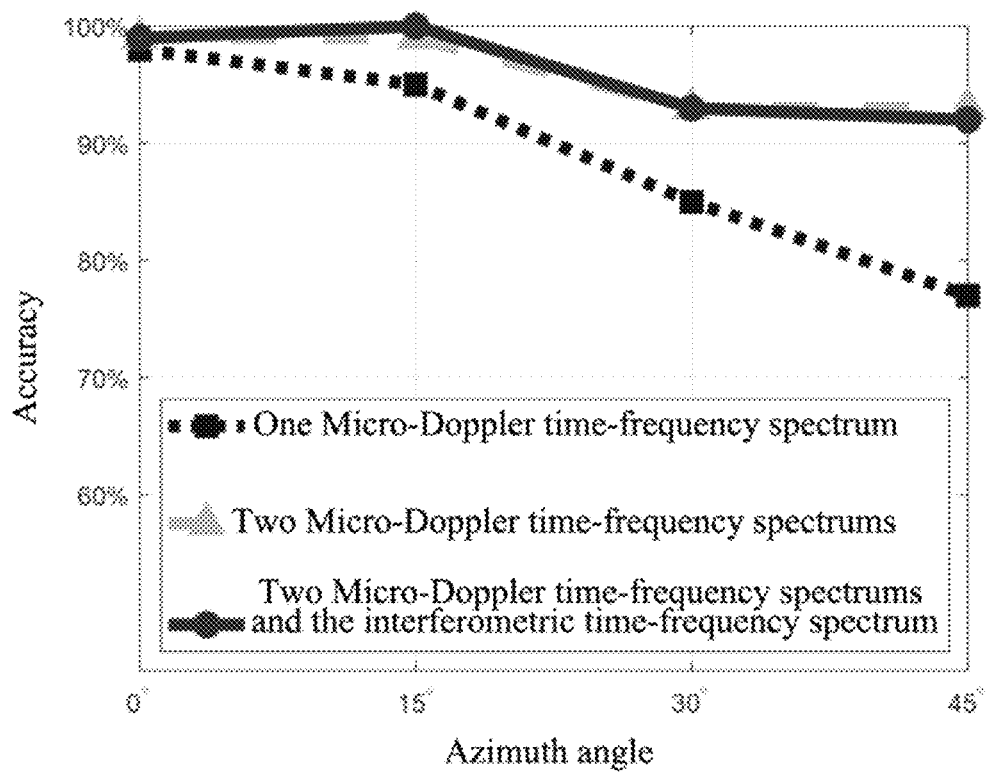
Figure 13I:
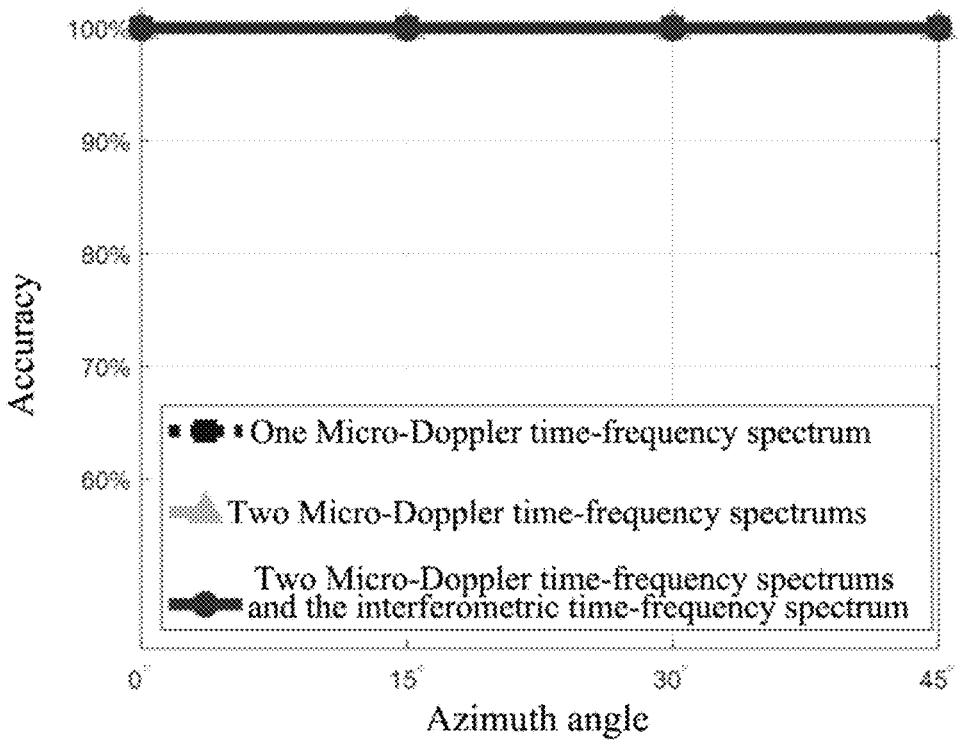

The following describes the radial and transversal empirical features of the target to be recognized using three feature values as three dimensions with reference to FIG. 11 and FIG. 12, and explains how the transversal velocity features and the radial velocity feature complement each other.

FIG. 11 is a distribution diagram of radial empirical features of test samples of the target to be recognized provided by the present application. This distribution diagram is obtained when the azimuth angle of the target to be recognized is zero degree, that is, when the target to be recognized is right opposite to the radar, and under the condition that each of the 9 categories of the target to be recognized (i.e., 9 hand gestures) is sampled to obtain 100 test samples. Among them, one is a blank reference, and the other eight are valid gestures. As shown in FIG. 11, gestures 1 to 8 represent the eight valid gestures shown in FIG. 6, where Posture 1 corresponds to FIG. 6(*d*), Posture 2 corresponds to FIG. 6(*a*), Posture 3 corresponds to FIG. 6(*g*), Posture 4 corresponds to FIG. 6(*h*), Posture 5 corresponds to FIG. 6(*c*), Posture 6 corresponds to FIG. 6(*b*), Posture 7 corresponds to FIG. 6(*e*), and Posture 8 corresponds to FIG. 6(*f*), the blank reference corresponds to FIG. 6(*i*). From FIG. 11, it can be known that Gestures 1 to 3 can be accurately recognized based on radial empirical features, but Gestures 4 to 8 will interfere with each other if the recognition is performed only based on radial empirical features, thereby affecting the recognition accuracy. In order to distinguish these confusing gestures, the transversal empirical features of the target to be recognized are introduced as shown in FIG. 12.

FIG. 12 is a distribution diagram of transversal empirical features of test samples of the target to be recognized provided by the present application. The conditions for obtaining this distribution diagram are the same as those of FIG. 11, and details are not described herein again. As shown in FIG. 12, Postures 1 to 8 correspond to the eight gesture numbers in FIG. 11, the recognition accuracy of some gestures will be affected if the recognition is only performed based on the transversal empirical features of FIG. 12, however, when combining the radial and transversal empirical features shown in FIG. 11 and FIG. 12, these eight valid gestures can be distinguished accurately, therefore, it can be known that the transversal velocity complements the radial velocity effectively, and the cooperation of the two can improve the accuracy of posture recognition.

S307, inputting the first empirical feature, the second empirical feature and the interferometric empirical feature into a support vector machine with a linear kernel to obtain a category of the posture of the target to be recognized.

In the embodiment, the support vector machine (SVM) with the linear kernel is adopted to classify the gesture, i.e., the posture of the target to be recognized, where the calculated first empirical feature, second empirical feature, and interferometric empirical feature are input into the SVM to obtain the gesture category.

To illustrate the fact that, in the embodiment, when the target to be recognized is under different azimuth angles, the introduction of the transversal velocity feature can improve the accuracy and stability of posture recognition under different azimuth angles, the following gives comparison among the recognition accuracy of the embodiment, that of one traditional Micro-Doppler time-frequency spectrum and that of two Micro-Doppler time-frequency spectrums, which is shown in Table 1 and FIG. 12.

Table 1 lists the accuracy of gesture recognition at four azimuth angles using one Micro-Doppler time-frequency spectrum, two Micro-Doppler time-frequency spectrums, and two Micro-Doppler time-frequency spectrums together with the interferometric time-frequency spectrum. When the azimuth angle is 15°, all three systems reach the highest accuracy. When the hand moves out of the main lobe of the antenna, the recognition accuracy under a larger azimuth angle decreases as the signal-to-noise ratio (SNR) decreases. For the case of using a radial Micro-Doppler time-frequency spectrum, since only radial micro-motion information can be obtained, the classification accuracy is very sensitive to the azimuth angle, and the accuracy at 45° is only 81.8%. For the other two cases, since the micro-motion information from different directions can be obtained, the influence of the azimuth angle on the recognition accuracy is relatively small. When classifying gestures according to the radial and transversal features, the interferometric radar achieves the highest recognition accuracy under all azimuth angles.

TABLE 1

Accuracy of gesture recognition under different azimuth angles in three systems

| | Accuracy Time-frequency spectrum for feature extraction | | |
|---|---|---|---|
| Azimuth angle | (a) | (b) | (c) |
| 0° | 90.8% | 96.4% | 96.8% |
| 15° | 93.7% | 98.7% | 99.3% |
| 30° | 92.6% | 96.8% | 97.2% |
| 45° | 81.8% | 93.0% | 95.3% |

(a) - One Micro-Doppler time-frequency spectrum
(b) - Two Micro-Doppler time-frequency spectrums
(c) - Two Micro-Doppler time-frequency spectrums and the interferometric time-frequency spectrum FIGS. 13a to 13i are relationship diagrams between recognition accuracy and azimuth angle of multiple gestures provided by the present application. FIGS. 13a to 13i correspond to the nine gestures in FIG. 6, (FIG. 13a) swiping from front to back, (FIG. 13b) swiping from back to front, (FIG. 13c) swiping from left to right, (FIG. 13d) swiping from right to left, (FIG. 13e) rotating counterclockwise, (FIG. 13f) rotating clockwise, (FIG. 13g) swiping from up to down, (FIG. 13h) swiping from down to up, (FIG. 13i) blank reference. As shown in FIGS. 13a to 13i, these nine figures show the relationship between the recognition accuracy of gestures and the azimuth angles. The classification accuracy curves of all nine gestures using the interferometric radar with transversal velocity features are almost always constant. It is obvious from the comparison of the three radar systems that the interferometric radar provides the highest stability in terms of the recognition accuracy of nine gestures, and it also exhibits robustness to changes in azimuth angles, that is, it preserves stable high-accuracy recognition performance at different azimuths.

Therefore, the introduction of the transversal velocity feature can significantly improve the accuracy of gesture recognition and the recognition stability under different azimuth angles.

In order to illustrate the ability of the embodiment of the present application to accurately recognize horizontally symmetrical postures, the embodiment is compared with two conventional radar recognition systems to obtain three systems, namely: one Micro-Doppler time-frequency spectrum, two Micro-Doppler time-frequency spectrums, two Micro-Doppler time-frequency spectrums and the interferometric time-frequency spectrum, comparison and analysis are done using confusion matrices of nine gesture classifications under different azimuth angles.

FIGS. 14a to 14i are confusion matrix diagrams of nine gestures classified by three systems provided by the present application under different azimuth angles. FIGS. 14a-14d are confusion matrix diagrams of the system with only one Micro-Doppler time-frequency spectrum; FIGS. 14e-14h are confusion matrix diagrams of the system with two Micro-Doppler time-frequency spectrums; FIGS. 14i-14l are confusion matrix diagrams of the system with two Micro-Doppler time-frequency spectrums and the interferometric time-frequency spectrum.

Figure 14A:
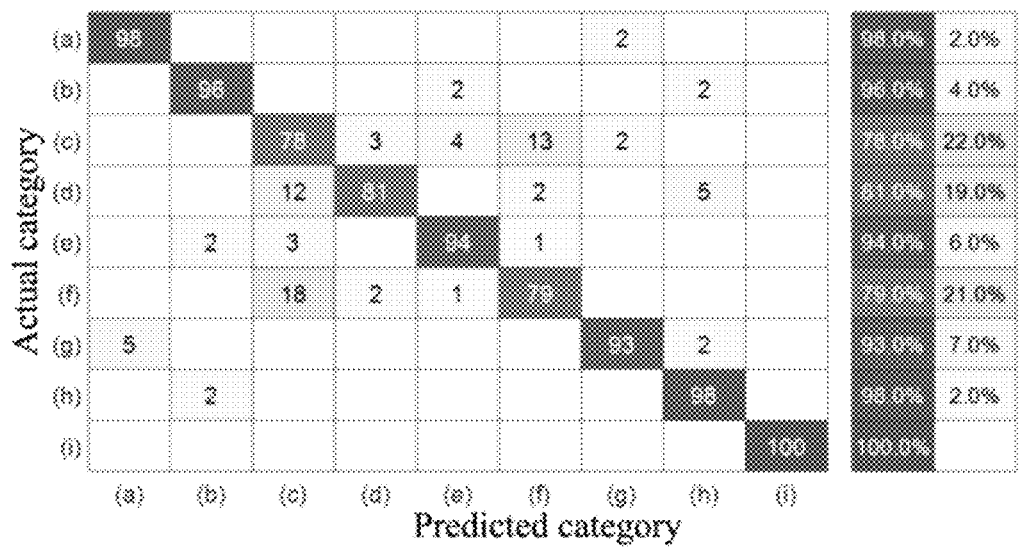
FIGS. 14a to 14l are confusion matrix diagrams of nine gestures classified by three systems provided by the present application under different azimuth angles.
Figure 14B:
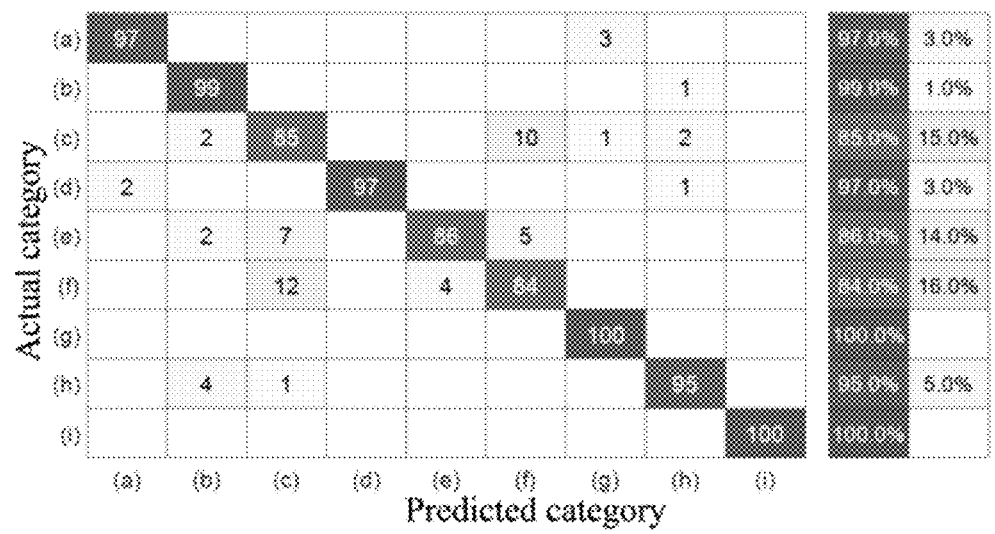
Figure 14C:
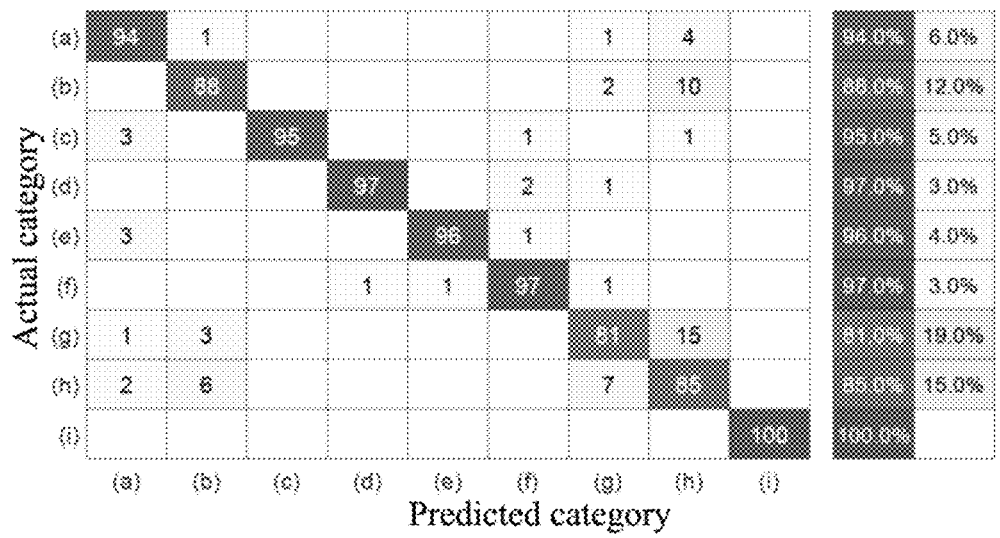
Figure 14D:
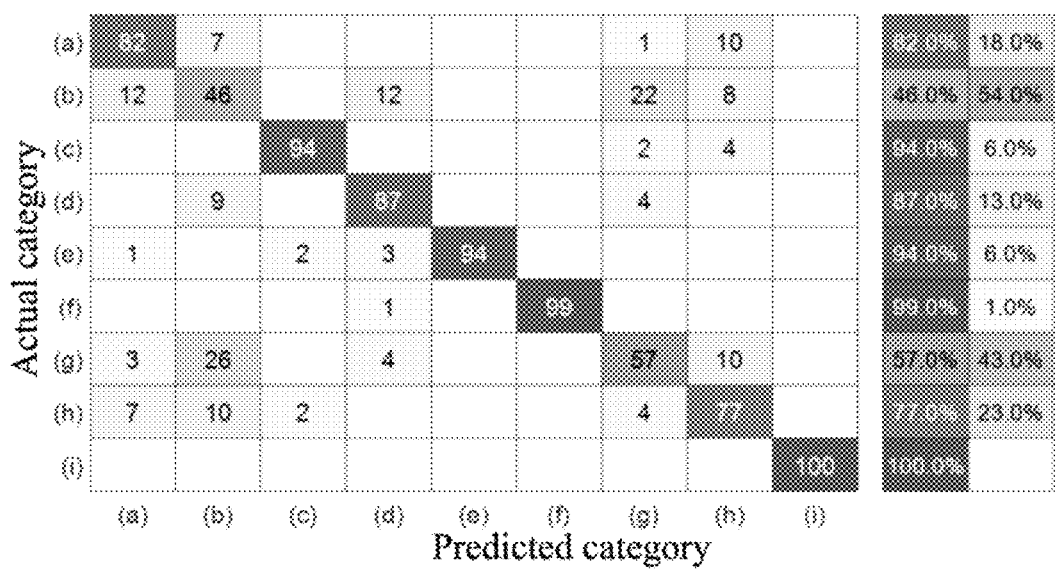
Figure 14E:
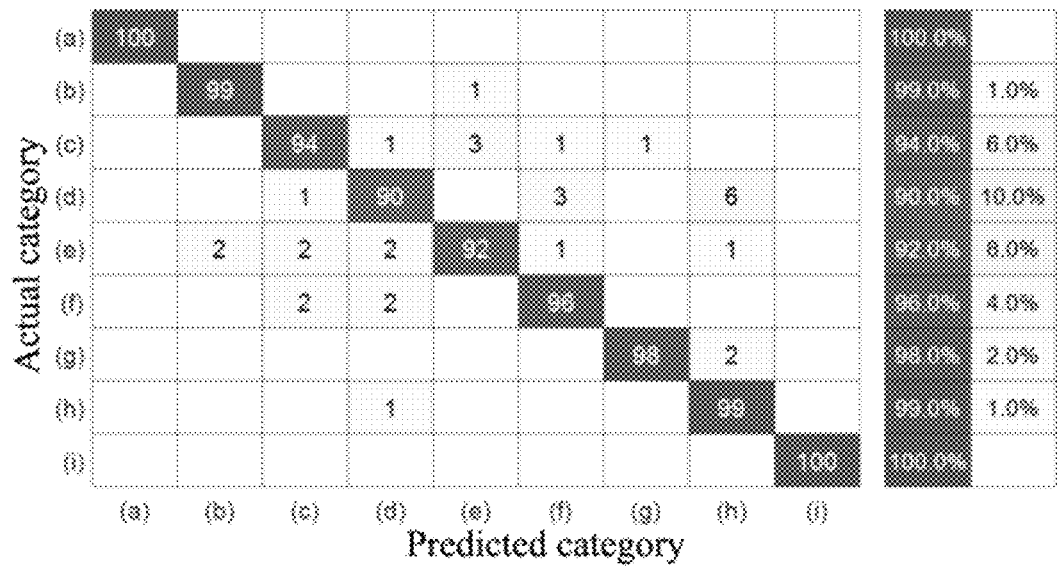
Figure 14F:
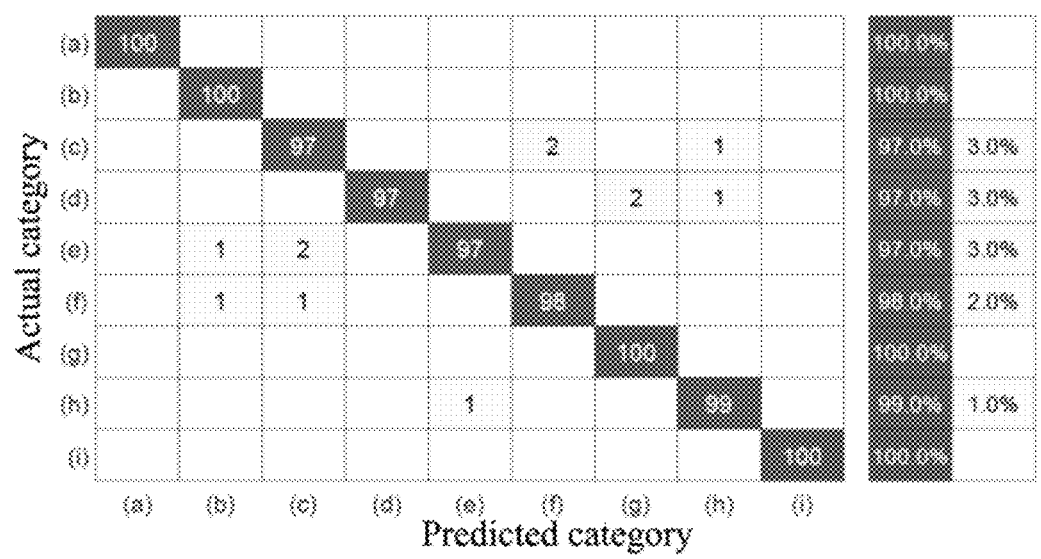
Figure 14G:
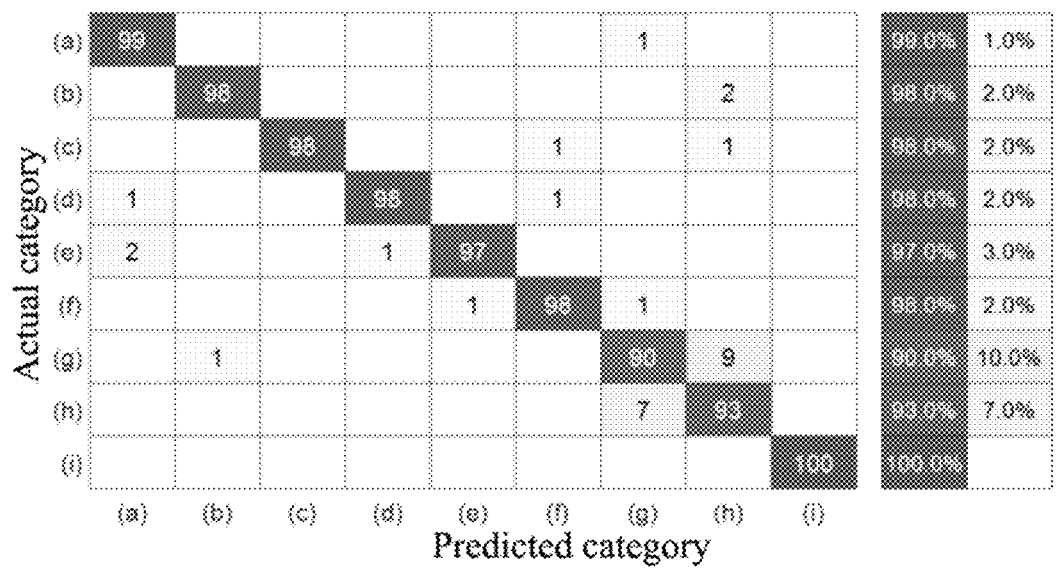
Figure 14H:
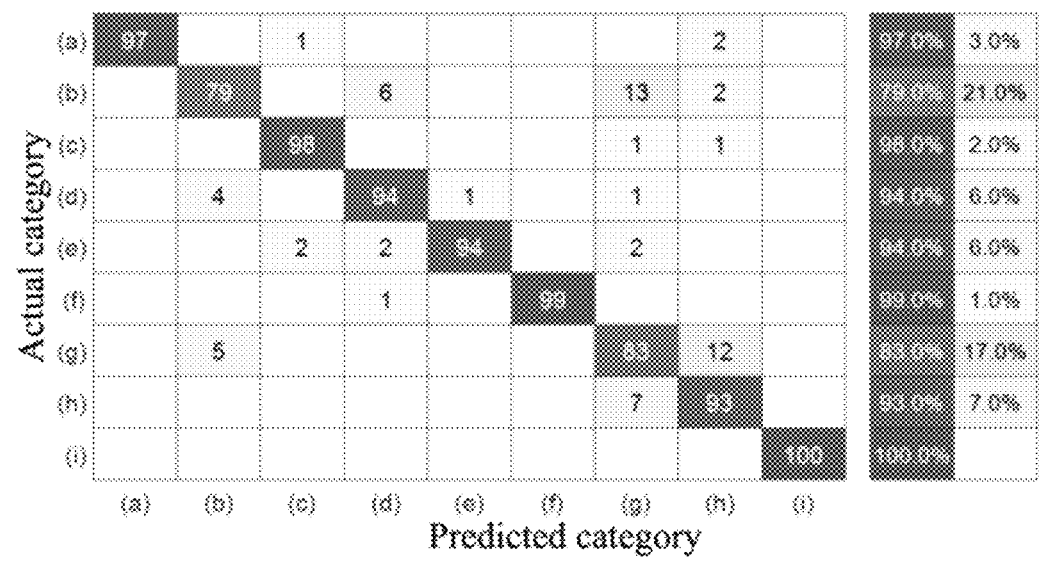
Figure 14I:
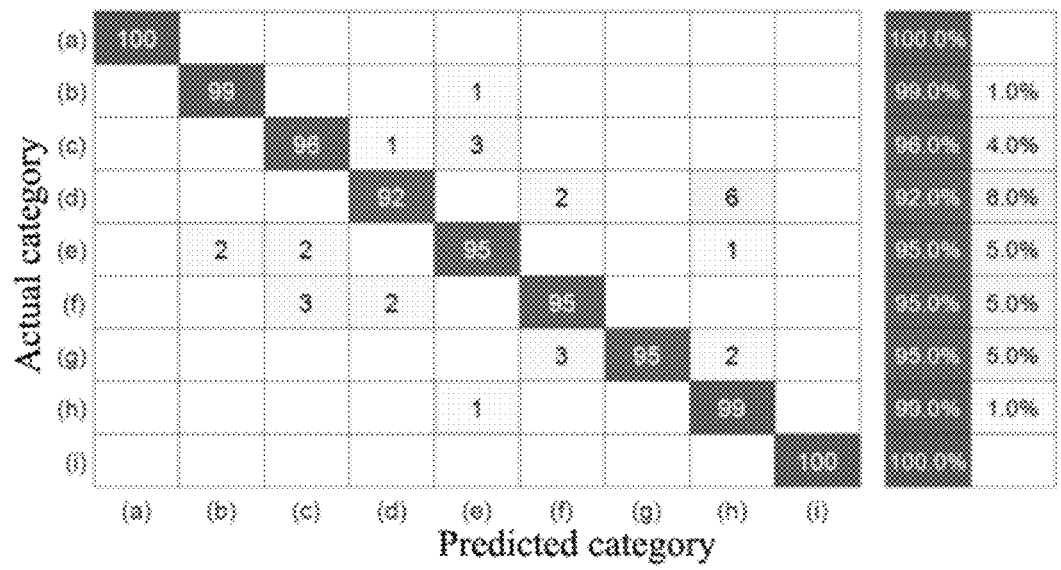
Figure 14J:
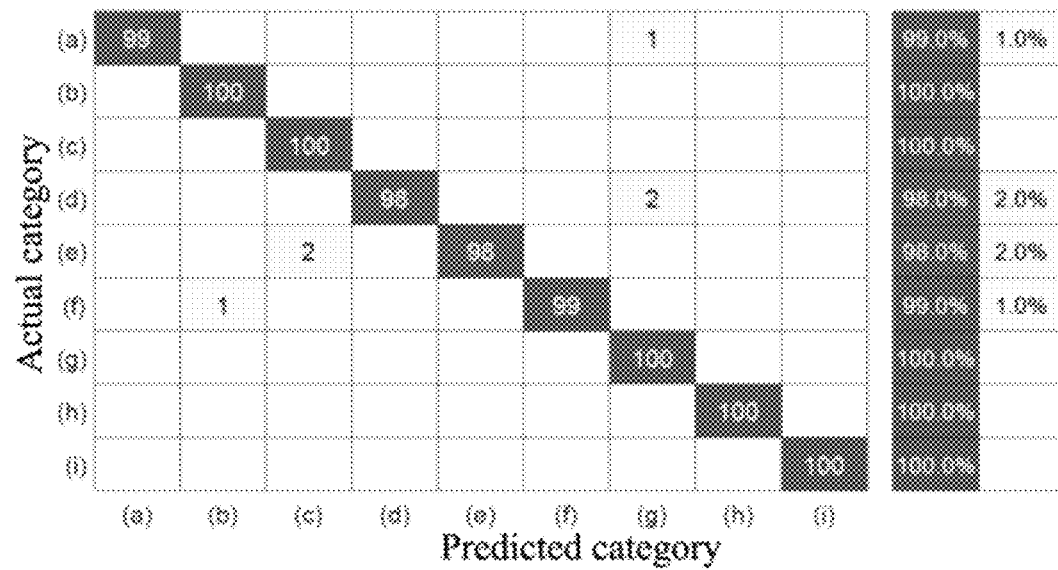
Figure 14K:
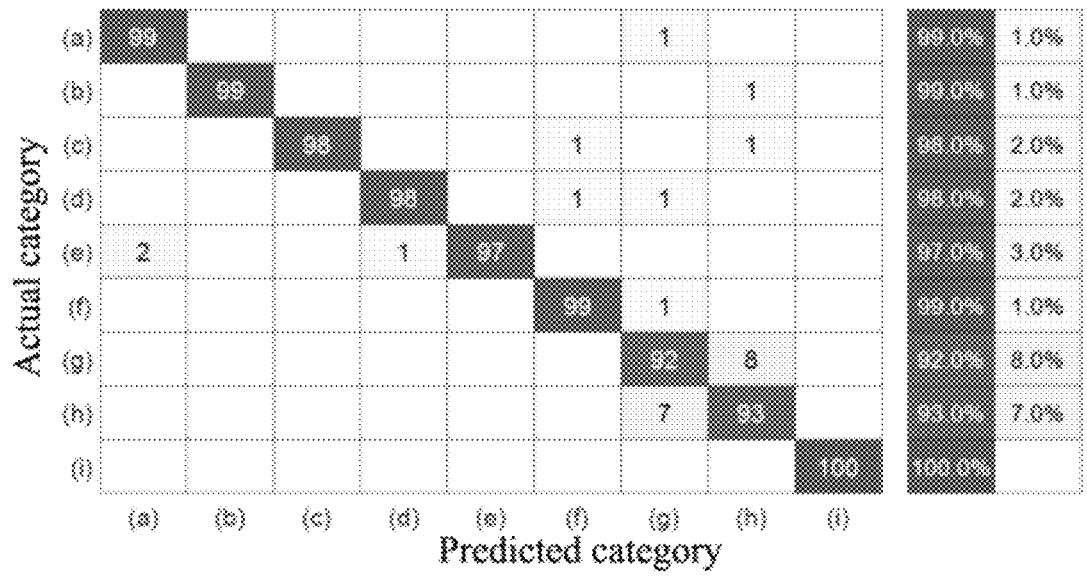
Figure 14L:
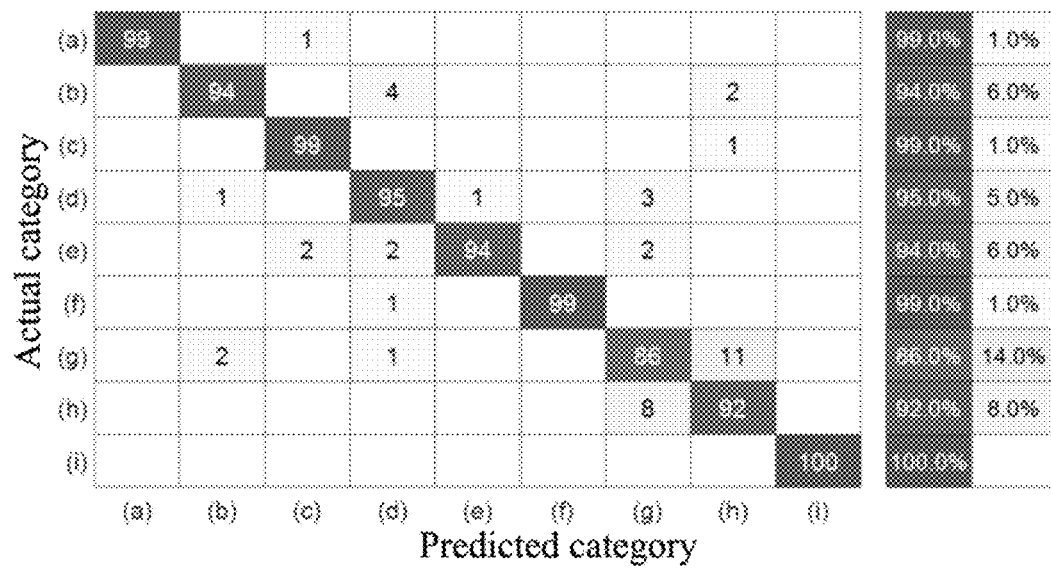

As shown in FIGS. 14a to 14l, the azimuth angles of FIGS. 14a, 14e and 14i are 0°; the azimuth angles of FIGS. 14b, 14f and 14j are 15°; the azimuth angle of FIGS. 14c, 14g and 14k are 30°; the azimuth angles of FIGS. 14d, 4h and 14i are 45°.

In the confusion matrices, horizontally symmetrical gestures (c) and (d), (e) and (f) are easily confused. However, since the human hand is a short-range distributed target, the Doppler radar can still recognize these horizontally symmetrical gestures in most cases. However, when the azimuth angle increases, the accuracy of distinguishing gestures (c) and (d) and gestures (e) and (f) drops sharply. In contrast, compared to radars with one or two Micro-Doppler time-frequency spectrums, the interferometric radar with transversal velocity features can still distinguish these horizontal symmetrical gestures with higher accuracy at large azimuth angles. It can be seen that since more micro-motion features can be extracted from different directions, and the use of the interferometric radar with transversal velocity features can achieve higher spatial resolution, the interferometric radar with transversal velocity features shows obvious advantage in distinguishing horizontally symmetrical gestures.

It can also be seen from the confusion matrices that the recognition accuracy of different gestures changes significantly under different azimuth angles. For example, at 0°, the false negative rate of gestures (c), (d) and (f) is relatively high. However, at 30°, gestures (a) and (b) are the most confusing. This shows that the same gesture shows different Micro-Doppler features under different azimuth angles. By fixing the azimuth angle when performing gestures to obtain more micro-motion information in the transversal direction, a higher classification accuracy can be obtained. Therefore, it can be drawn that compared with the traditional Doppler radar, the present application uses the transversal velocity features obtained from the interferometric radar with transversal velocity features, thereby effectively improving the performance of gesture classification and recognition, that is, the present application exhibits good adaptability under different azimuth angles, as well as very good performance for distinguishing different gestures, especially the horizontally symmetrical gestures.

The embodiment provides a method for recognizing a posture of a target, a first receiving signal and a second receiving signal upon scattering of a transmitting signal from a target to be recognized are acquired, then a first baseband signal is determined according to the first receiving signal and the transmitting signal, and a second baseband signal is determined according to the second receiving signal and the transmitting signal, and then time-frequency analysis is performed on the first baseband signal and the second baseband signal to obtain a first time-frequency spectrum and a second time-frequency spectrum, then interferometric processing is performed on the first baseband signal and the second baseband signal to obtain an interferometric signal, then processing the interferometric signal by using a preset time-frequency analysis algorithm to obtain an interferometric time-frequency spectrum, then using the preset feature extraction algorithm to extract a first empirical feature from the first time-frequency spectrum, to extract a second empirical feature from the second time-frequency spectrum, and to extract an interferometric empirical feature from the interferometric time-frequency spectrum, and finally inputting the first empirical feature, the second empirical feature and the interferometric empirical feature into a support vector machine with a linear kernel to obtain the category of the posture of the target to be recognized. The first empirical feature and the second empirical feature reflect radical velocity information of the target to be recognized, and the interferometric empirical feature can reflect transversal velocity information of the target to be recognized, by virtue of the binding among various feature values including the radial and transversal velocity information of the posture of the target, the transversal velocity information is complemented, hence, postures of the target under different azimuth angles and horizontally symmetrical postures (such as swiping from left to right and swiping from right to left) can be distinguished more accurately, thereby realizing recognition of the posture of the target with high accuracy and high stability, making the hardware cost and the algorithm complexity relatively low, and achieving good real-time interaction.

One of ordinary skill in the art can understand: all or part of the steps of implementing the above embodiments may be completed by hardware associated with program instructions. The foregoing program may be stored in a computer readable storage medium, and when the program is executed, the steps of the above method embodiment are performed. The aforementioned storage medium may include various media that can store program codes, such as, read-only memory (ROM), random access memory (RAM), hard disk, CD, etc.

Figure 15:
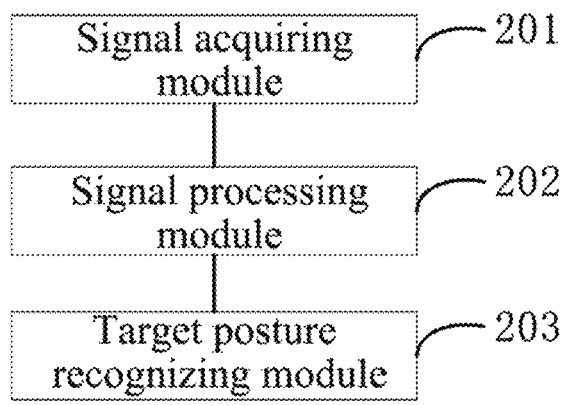
FIG. 15 is a structural diagram of apparatus for recognizing a posture of a target provided by the present application.

FIG. 15 is a structural diagram of apparatus for recognizing a posture of a target provided by the present application. The apparatus for recognizing the posture of the target may be implemented by software, hardware or a combination of both, and may be the aforementioned terminal.

As shown in FIG. 15, the apparatus 200 for recognizing the posture of the target includes a signal acquiring module 201, a signal processing module 202, and a target posture recognizing module 203.

The signal acquiring module 201, configured to acquire a first receiving signal and a second receiving signal upon scattering of a transmitting signal from a target to be recognized, where the transmitting signal is transmitted by a transmitting antenna of a radar, the first receiving signal is received by a first receiving antenna of the radar, the second receiving signal is received by a second receiving antenna of the radar, and the radar includes at least two receiving antennas;

the signal processing module 202, configured to determine a first baseband signal according to the first receiving signal and the transmitting signal, and determine a second baseband signal according to the second receiving signal and the transmitting signal; and the target posture recognizing module 203, configured to determine a category of the posture of the target to be recognized according to the first baseband signal and the second baseband signal.

In some possible designs, the signal processing module 202 is further configured to determine, according to the first baseband signal and the second baseband signal, radial velocity information of the target to be recognized by using a preset time-frequency analysis algorithm;

the signal processing module 202 is further configured to perform interferometric processing to the first baseband signal and the second baseband signal to obtain transversal velocity information of the target to be recognized; and the target posture recognizing module 203 is configured to determine the category of the posture of the target to be recognized according to the transversal velocity information and the radial velocity information.

In some possible designs, the signal processing module 202 is further configured to perform interferometric processing to the first baseband signal and the second baseband signal to obtain an interferometric signal;

the signal processing module 202 is further configured to determine, according to the interferometric signal, an interferometric time-frequency spectrum of the target to be recognized by using the preset time-frequency analysis algorithm; and the signal processing module 202 is further configured to determine an interferometric empirical feature according to the interferometric time-frequency spectrum and a preset feature extraction algorithm, where the transversal velocity information includes the interferometric empirical feature.

In some possible designs, the signal processing module 202 is further configured to use the preset time-frequency analysis algorithm to determine a first time-frequency spectrum corresponding to the first baseband signal and a second time-frequency spectrum corresponding to the second baseband signal;

the signal processing module 202 is further configured to determine a first empirical feature according to the first time-frequency spectrum and the preset feature extraction algorithm, and determine a second empirical feature according to the second time-frequency spectrum and the preset feature extraction algorithm, where the radial velocity information includes the first empirical feature and the second empirical feature.

In some possible designs, the target posture recognizing module 203 is configured to determine, according to the transversal velocity information and the radial velocity information, the category of the posture of the target to be recognized by using a support vector machine with a linear kernel.

In some possible designs, the signal processing module 202 is further configured to extract information on a centroid for positive frequencies and information on a centroid for negative frequencies in a time-frequency spectrum, where the information on the centroid includes a frequency of the centroid and a time of the centroid, the time-frequency spectrum includes the interferometric time-frequency spectrum, the first time-frequency spectrum and the second time-frequency spectrum, the positive frequency is a frequency when the target to be recognized moves toward the radar, and the negative frequency is a frequency when the target to be recognized moves away from the radar;

the signal processing module 202 is further configured to generate empirical features according to the information on the centroid for the positive frequencies and the information on the centroid for the negative frequencies, where the empirical features include the interferometric empirical feature, the first empirical feature and the second empirical feature.

In some possible designs, the signal processing module 202 is further configured to generate the empirical features including a first feature value, a second feature value and a third feature value; the first feature value is an average frequency of a time-frequency spectrum; the second feature value is a difference between the frequency of the centroid for the positive frequencies and the frequency of the centroid for the negative frequencies in a time-frequency spectrum; and the third feature value is a difference between the time of the centroid for the positive frequencies and the time of the centroid for the negative frequencies in a time-frequency spectrum.

In some possible designs, the signal processing module 202 is further configured to perform a short-time Fourier transform on a signal to obtain a Micro-Doppler time-frequency spectrum by using a preset time-frequency analysis algorithm.

It is worth noting that the apparatus for recognizing the posture of the target provided by the embodiment shown in FIG. 15 can execute the method for recognizing a posture of a target provided by any of the above method embodiments. The specific implementation principles and technical effects are similar, which are not repeated herein again.

Figure 16:
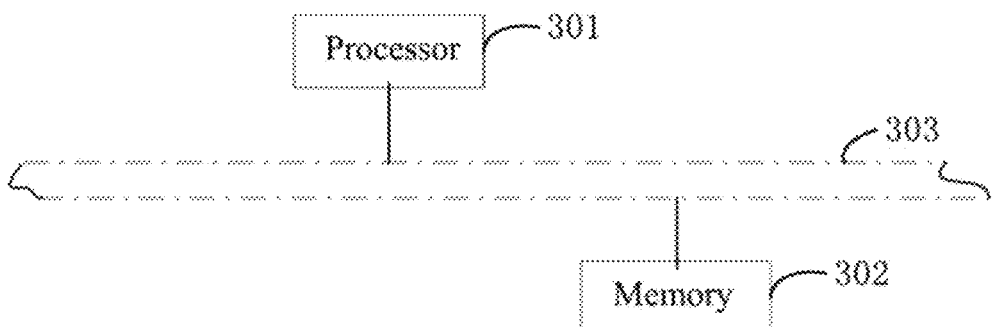
FIG. 16 is a structural diagram of electronic equipment for recognizing a posture of a target provided by the present application.

FIG. 16 is a structural diagram of electronic equipment for recognizing a posture of a target provided by the present application. As shown in FIG. 16, the electronic equipment 300 for recognizing a posture of a target may include: at least one processor 301 and a memory 302.

FIG. 16 shows electronic equipment with one processor as an example.

The memory 302 is configured to store a program. Specifically, the program can include program codes, the program codes include computer operating instructions.

The memory 302 may include a high speed RAM memory, and may also include a non-volatile memory, such as at least one hard disk memory.

The processor 301 is configured to execute computer executable instructions stored in the memory 302, to realize the method for recognizing a posture of a target described in the above method embodiments.

Where the processor 301 may be a central processing unit (CPU), or an application specific integrated circuit (ASIC), or one or more integrated circuits configured to implement the embodiments of the present application.

Optionally, the memory 302 can be independent, or can be integrated with the processor 301. When the memory 302 is a component independent from the processor 301, the electronic equipment 300 also includes:

a bus 303, configured to connect the processor 301 and the memory 302. The bus may be an industry standard architecture (ISA) bus, a peripheral component interconnection (PCI) bus, or an extended industry standard architecture (EISA) bus, and the like. The bus can be divided into an address bus, a data bus, a control bus, etc., but it does not mean that there is only one bus or one type of bus.

Optionally, in specific implementations, if the memory 302 and the processor 301 are integrated on one chip, then the memory 302 and the processor 301 can complete communication through an internal interface.

The present application further provides a computer readable storage medium, the computer readable storage medium may include various mediums that can store program codes, such as, a USB flash disk, a portable hard disk, a read-only memory (ROM), a random access memory (RAM), a magnetic disk or an optical disk, etc. Specifically, the computer readable storage medium stores program instructions, and the program instructions are configured to implement the method for recognizing a posture of a target in the above embodiments.

Finally, it should be noted that, the above embodiments are only an illustration of the technical solutions of the present application, but not intended to be a limitation. Although the present application has been described in detail with reference to the foregoing embodiments, those ordinarily skilled in the art should understand that the technical solutions described in the foregoing embodiments may be modified, or some or all of the technical features may be equivalently replaced; but the modifications or substitutions do not deviate from the technical solutions of the embodiments of the present application.

What is claimed is:

1. A method for recognizing a posture of a target, comprising:

acquiring a first receiving signal and a second receiving signal upon scattering of a transmitting signal from a target to be recognized, wherein the transmitting signal is transmitted by a transmitting antenna of a radar, the first receiving signal is received by a first receiving antenna of the radar, the second receiving signal is received by a second receiving antenna of the radar, and the radar comprises at least two receiving antennas;

determining a first baseband signal according to the first receiving signal and the transmitting signal, and determining a second baseband signal according to the second receiving signal and the transmitting signal; and determining a category of the posture of the target to be recognized according to the first baseband signal and the second baseband signal;

wherein the determining a category of the posture of the target to be recognized according to the first baseband signal and the second baseband signal comprises:

determining, according to the first baseband signal and the second baseband signal, radial velocity information of the target to be recognized by using a preset time-frequency analysis algorithm;

performing interferometric processing on the first baseband signal and the second baseband signal to obtain transversal velocity information of the target to be recognized; and determining the category of the posture of the target to be recognized according to the transversal velocity information and the radial velocity information;

wherein the performing interferometric processing on the first baseband signal and the second baseband signal to obtain transversal velocity information of the target to be recognized comprises:

performing interferometric processing on the first baseband signal and the second baseband signal to obtain an interferometric signal;

determining, according to the interferometric signal, an interferometric time-frequency spectrum of the target to be recognized by using the preset time-frequency analysis algorithm; and determining an interferometric empirical feature according to the interferometric time-frequency spectrum and a preset feature extraction algorithm, wherein the transversal velocity information comprises the interferometric empirical feature;

wherein the determining, according to the first baseband signal and the second baseband signal, radial velocity information of the target to be recognized by using a preset time-frequency analysis algorithm comprises:

using the preset time-frequency analysis algorithm to determine a first time-frequency spectrum corresponding to the first baseband signal and a second time-frequency spectrum corresponding to the second baseband signal; and determining a first empirical feature according to the first time-frequency spectrum and the preset feature extraction algorithm, and determining a second empirical feature according to the second time-frequency spectrum and the preset feature extraction algorithm, wherein the radial velocity information comprises the first empirical feature and the second empirical feature;

wherein the determining the category of the posture of the target to be recognized according to the transversal velocity information and the radial velocity information comprises:

determining, according to the transversal velocity information and the radial velocity information, the category of the posture of the target to be recognized by using a support vector machine with a linear kernel;

wherein the preset feature extraction algorithm comprises:

extraction of information on a centroid for positive frequencies and information on a centroid for negative frequencies in a time-frequency spectrum, wherein the information on the centroid comprises a frequency of the centroid and a time of the centroid, the time-frequency spectrum comprises the interferometric time-frequency spectrum, the first time-frequency spectrum and the second time-frequency spectrum, the positive frequency is a frequency when the target to be recognized moves toward the radar, and the negative frequency is a frequency when the target to be recognized moves away from the radar; and generation of empirical features according to the information on the centroid for the positive frequencies and the information on the centroid for the negative frequencies, wherein the empirical features comprise the interferometric empirical feature, the first empirical feature and the second empirical feature.

2. The method for recognizing a posture of a target according to claim 1, wherein the empirical features comprise a first feature value, a second feature value and a third feature value;

the first feature value is an average frequency of a time-frequency spectrum;

the second feature value is a difference between the frequency of the centroid for the positive frequencies and the frequency of the centroid for the negative frequencies in a time-frequency spectrum; and the third feature value is a difference between the time of the centroid for the positive frequencies and the time of the centroid for the negative frequencies in a time-frequency spectrum.

3. The method for recognizing a posture of a target according to claim 1, wherein the preset time-frequency analysis algorithm is to perform a short-time Fourier transform on a signal to obtain a Micro-Doppler time-frequency spectrum.

4. Electronic equipment for recognizing a posture of a target, comprising:

a processor; and a memory, configured to store executable instructions of the processor;

wherein the processor is configured to execute the executable instructions to implement steps of:

acquiring a first receiving signal and a second receiving signal upon scattering of a transmitting signal from a target to be recognized, wherein the transmitting signal is transmitted by a transmitting antenna of a radar, the first receiving signal is received by a first receiving antenna of the radar, the second receiving signal is received by a second receiving antenna of the radar, and the radar comprises at least two receiving antennas;

determining a first baseband signal according to the first receiving signal and the transmitting signal, and determining a second baseband signal according to the second receiving signal and the transmitting signal; and determining a category of the posture of the target to be recognized according to the first baseband signal and the second baseband signal, determining, according to the first baseband signal and the second baseband signal, radial velocity information of the target to be recognized by using a preset time-frequency analysis algorithm;

performing interferometric processing on the first baseband signal and the second baseband signal to obtain transversal velocity information of the target to be recognized; and determining the category of the posture of the target to be recognized according to the transversal velocity information and the radial velocity information;

performing interferometric processing on the first baseband signal and the second baseband signal to obtain an interferometric signal;

determining, according to the interferometric signal, an interferometric time-frequency spectrum of the target to be recognized by using the preset time-frequency analysis algorithm; and determining an interferometric empirical feature according to the interferometric time-frequency spectrum and a preset feature extraction algorithm, wherein the transversal velocity information comprises the interferometric empirical feature;

using the preset time-frequency analysis algorithm to determine a first time-frequency spectrum corresponding to the first baseband signal and a second time-frequency spectrum corresponding to the second baseband signal; and determining a first empirical feature according to the first time-frequency spectrum and the preset feature extraction algorithm, and determining a second empirical feature according to the second time-frequency spectrum and the preset feature extraction algorithm, wherein the radial velocity information comprises the first empirical feature and the second empirical feature;

determining, according to the transversal velocity information and the radial velocity information, the category of the posture of the target to be recognized by using a support vector machine with a linear kernel;

wherein the preset feature extraction algorithm comprises:

extraction of information on a centroid for positive frequencies and information on a centroid for negative frequencies in a time-frequency spectrum, wherein the information on the centroid comprises a frequency of the centroid and a time of the centroid, the time-frequency spectrum comprises the interferometric time-frequency spectrum, the first time-frequency spectrum and the second time-frequency spectrum, the positive frequency is a frequency when the target to be recognized moves toward the radar, and the negative frequency is a frequency when the target to be recognized moves away from the radar; and generation of empirical features according to the information on the centroid for the positive frequencies and the information on the centroid for the negative frequencies, wherein the empirical features comprise the interferometric empirical feature, the first empirical feature and the second empirical feature.

5. The electronic equipment for recognizing a posture of a target according to claim 4, wherein the empirical features comprise a first feature value, a second feature value and a third feature value;

the first feature value is an average frequency of a time-frequency spectrum;

the second feature value is a difference between the frequency of the centroid for the positive frequencies and the frequency of the centroid for the negative frequencies in a time-frequency spectrum; and the third feature value is a difference between the time of the centroid for the positive frequencies and the time of the centroid for the negative frequencies in a time-frequency spectrum.

6. The electronic equipment for recognizing a posture of a target according to claim 4, wherein the preset time-frequency analysis algorithm is to perform a short-time Fourier transform on a signal to obtain a Micro-Doppler time-frequency spectrum.

* * * * *